United States Patent
Suarez et al.

(10) Patent No.: US 6,661,927 B1
(45) Date of Patent: Dec. 9, 2003

(54) SYSTEM AND METHOD FOR EFFICIENTLY ENCODING AN IMAGE BY PRIORITIZING GROUPS OF SPATIALLY CORRELATED COEFFICIENTS BASED ON AN ACTIVITY MEASURE

(75) Inventors: Jose I. Suarez, Coral Gables, FL (US); Yolanda Prieto, Miami, FL (US); Yolanda M. Pirez, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 46 days.

(21) Appl. No.: 09/628,106

(22) Filed: Jul. 27, 2000

(51) Int. Cl.[7] .............................. G06K 9/36; G06K 9/46
(52) U.S. Cl. ............. 382/240; 375/240.11; 375/240.27; 382/239
(58) Field of Search ........................... 348/397.1, 398.1, 348/408.1, 419.1, 423.1, 437.1, 438.1; 358/261.2, 430; 375/240.02–240.07, 240.1, 240.11, 240.18, 240.19, 240.27; 382/232, 240, 239, 248

(56) References Cited

U.S. PATENT DOCUMENTS

| | | | | |
|---|---|---|---|---|
| 5,337,049 A | * | 8/1994 | Shimoda | 375/240.24 |
| 5,481,308 A | * | 1/1996 | Hartung et al. | 375/240.11 |
| 5,604,602 A | | 2/1997 | Guillotel et al. | 386/33 |
| 5,699,457 A | | 12/1997 | Adar et al. | 382/239 |
| 5,802,481 A | | 9/1998 | Prieto | 702/190 |
| 5,974,181 A | | 10/1999 | Prieto | 382/232 |
| 6,289,297 B1 | * | 9/2001 | Bahl | 375/240.19 |

OTHER PUBLICATIONS

Andrew, J.P., Ogunbona, P.O., and Paoloni, F.J., "Coding Gain and Spatial Localisation Properties of Discrete wavelet transform Filters for Image Coding," Electrical and Computer Engineering Department, University of Wollongong, NSW 2522, Australia, IEE, 1995, Paper 1938K (E4).

Said, A. and Pearlman, W.A., "An Image Multiresolution Representation for Lossless and Lossy Compression," SPIE Symposium on Visual Communications and Image Processing, Cambridge, MA, Nov. 1993 (to appear in the IEEE Transactions on Image Processing).

Said, A. and Pearlman, W.A., "A New Fast and Efficient Image Codec Based on Set Partitioning in Hierarchical Trees," IEEE Transactions on Circuits and Systems for Video Technology, vol. 6, Jun. 1996, IEEE Int. Symp. on Circuits and Systems, Chicago, IL, May 1993.

* cited by examiner

Primary Examiner—Timothy M. Johnson
(74) Attorney, Agent, or Firm—Miller, Johnson, Snell & Cummiskey, P.L.C.

(57) ABSTRACT

An encoder (300) selects (702, 1302, 1304, 1306, 1308) one or more subsets of spatially or temporally correlated transformed data coefficients, on the basis of the significance of each subset in representing the data. The encoder (300) and a complementary decoder (400) may be applied to wavelet transform encoded images (500). The encoder (300) may be implemented on a wireless to Internet gateway server (108), in order to reduce byte size of encoded images (500) sent through a wireless network (112), and reduce the amount of processing that must be performed by a wireless device (118) to decode an image or other data. The decoder (400) and/or encoder (300) may be implemented on the wireless device (118).

11 Claims, 21 Drawing Sheets

BLOCK DIAGRAM OF IMAGE ENCODER (1ST EMBODIMENT)

SYSTEM AND METHOD FOR EFFICIENTLY ENCODING AN IMAGE BY PRIORITIZING GROUPS OF SPATIALLY CORRELATED COEFFICIENTS BASED ON AN ACTIVITY MEASURE

FIELD OF THE INVENTION

This invention pertains to encoding and decoding data to reduce its byte size. More particularly the invention pertains to an efficient system for post processing transformed data coefficients (e.g., wavelet transformed image data).

BACKGROUND OF THE INVENTION

In the information age, the exchange of a variety of forms of multimedia data is commonplace and ever increasing. The exchanged data may, for example, comprise images, audio, or time series data representing scientific or business related information.

Various schemes of encoding data are known. A key purpose of encoding data is to 'compress' the data, i.e., to reduce the byte size of the data. This is desirable for reasons including the reduction of memory space required to store the data, and reduction of the time required to transmit the data through a communication channel having a certain finite bandwidth. The byte size can be expressed as bits per sample, or as is conventional in the case of image data, as bits per pixel.

Two classes of encoding methods are lossless and lossy. The former, more conservative approach endeavors to preserve every detail of the input data in the encoded form. Ideally the decoded version would be an indistinguishable replica of the input data.

In the case of lossy data encoding (compression), the level to which the detail of the image is preserved can be selected and there will be a trade-off between the level of detail preserved and the byte size of the resulting encoded data. Often in using lossy data encoding, one strives to obtain a level of detail preservation such that the differences between a decoded version and the original are imperceptible. Judgments about the design and configuration of the lossy encoder to achieve imperceptible differences will be made in consideration of human perception models (e.g., hearing, or visual). A good lossy encoder and corresponding decoder will yield a decoded data set which may be distinguished from the original data set by rigorous scientific analysis but is indistinguishable to a human observer when presented in an intended format (e.g., screen resolution in the case of images).

One class of data encoding methods (applicable to image data) is transform coding. Generally speaking, in transform coding an ordered data set is projected onto an orthogonal set of basis functions to obtain a set of transformed data coefficients (inner products). The traditional type of transform coding derives from Fourier analysis. In Fourier based techniques, a data set is projected onto a set of functions derived from sinusoidal functions. The old JPEG standard (ISO/IEC 10928-1) is an example of a transform encoding method based on Fourier analysis. The old TPEG standard specifies a set of transform matrices which are discrete representations of products of a cosine function with a horizontal coordinate dependant argument and a cosine function with a vertical coordinate dependant argument. These basis functions are applied to analyze 8 by 8 pixel blocks of an input image.

A shortcoming of the Fourier based techniques, which prompted workers in the data compression art to take up other techniques as will be described shortly, is the fact that the sinusoidal function repeat indefinitely out to plus and minus infinity, whereas data sets which are encoded are localized in the time (or spatial) domain and have features which are further localized within the data set. Given the unbounded domain of Fourier bases functions and the periodic nature of data sets to be encoded over long intervals (or spans) one is led to segment the signal (e.g., into the aforementioned 8 by 8 blocks) in order to obtain a more efficient encoding. Unfortunately, this leads to abrupt jumps in the decoded version of the signal at edges between the segments. In the image processing art this is known as blocking effects.

Newer classes of transform methods employ basis functions which are inherently localized in the spatial domain. Mathematically speaking they are compactly supported. One example of the newer type of transform method is the wavelet based techniques. Wavelet based techniques employ a set of basis functions comprising a mother wavelet and a set of child wavelets derived from the mother wavelet by applying different time (or spatial) domain shifts and dilations to the mother wavelet. A wavelet basis set comprising a set of functions with localized features at different characteristic scales, is better suited to encode data sets such as image or audio data sets which have fine, course and intermediate features at different locations (times).

Multilevel wavelet decomposition is an iterative process, namely multi-resolutional decomposition. At each iteration a lower frequency set of transformed data coefficients generated by a prior iteration is again refined to produce a substitute set of transformed data coefficients including a lower spatial frequency group and a higher spatial frequency group, called subbands.

Returning to the matter of lossy encoding, whether it be Fourier, wavelet or otherwise based, the manner in which the reduction in the byte size (with the associated loss of detail) is achieved, according to the common prior art approach, is by quantizing the transformed data coefficients. Depending on the quantization and coding methods used, this step can be a computationally intensive operation which may account for up to 70% of the computational expense of a wavelet based encoder. Quantizing involves adjusting downward in the resolution with which the value of the transformed data coefficients are recorded, so that they can be recorded using fewer bits. In the case of image data, transformed data coefficients associated with basis function that depend on finer details in the data will be quantized with less resolution. The decision to do this is based on current understanding of human visual perception.

In connection with perception as it relates to lossy image encoding it bears mentioning that there are quantitative measures such as SNR which aim at characterizing the fidelity of an encoded and decoded image to the original, however these measures are not always in accord with human assessments of the quality.

All of the quantizing values can be adjusted to yield lower image fidelity and correspondingly reduced byte size. Quantizing values that are used for an entire image can be varied, or different sets of quantizing values that are used for separate blocks of an image can be adjusted.

The new JPEG 2000 standard suggests providing "progressive transmission" whereby an encoded image can be transmitted at various resolutions. This is intended to afford adaptation to the display of the client receiving the image. According to the standard, this will be accomplished by a certain arrangement of the bit stream.

The predominant application for transform encoding is for storing data on, and sending data over the Internet. Extension of the Internet to wireless physical networks is currently in the early stages. Wireless networks generally have less bandwidth than fiber optic or copper Internet networks, therefore slower web browsing and long downloads can be expected for the same byte size transform encoded data (e.g., images).

Portable wireless devices generally have a low processing power and are therefore ill suited to perform computationally intensive operations such as quantizing and complex entropy coding.

Wireless networks are subject to connection instability. A connection may fail while an image is being transmitted and decoded. Prior art decoding schemes paint images in raster scan pattern, either in one pass or multiple passes, yielding successively better resolution. In the former case, if the connection is broken, part of the area of the image will be missing. In the latter case, the image would be left with an unsightly boundary between an upper high-quality area and a lower poor-quality area.

What is needed is a system and method for encoding and decoding data which will achieve the highest possible level of fidelity of the decoded data with respect to the original data for a given allocation of bits per sample in the encoded representation with minimal computational costs.

BRIEF DESCRIPTION OF THE FIGURES

The features of the invention believed to be novel are set forth in the claims. The invention itself, however, may be best understood by reference to the following detailed description of certain exemplary embodiments of the invention, taken in conjunction with the accompanying drawings in which:

DETAILED DESCRIPTION OF THE PREFERRED EMBODIMENTS

Figure 1:
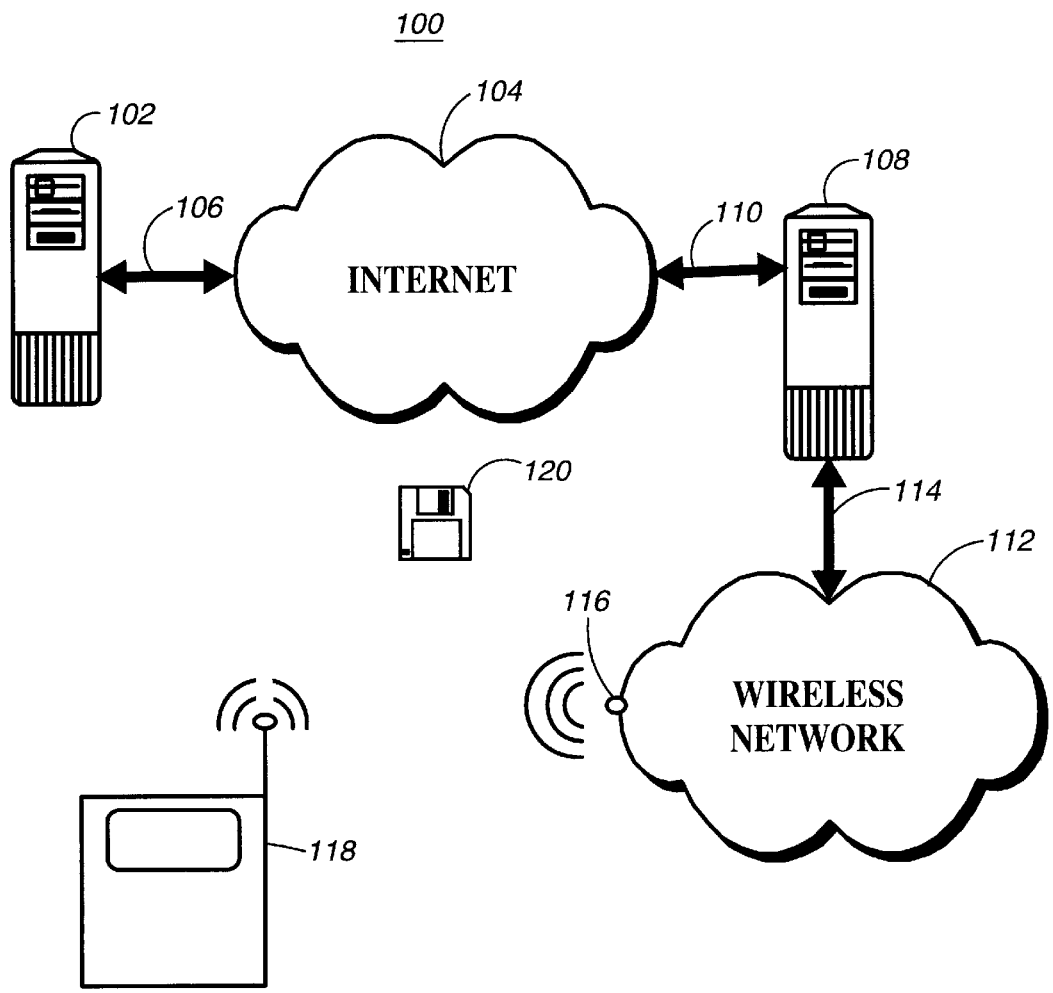
FIG. 1 is a schematic of a communication network and system according to a preferred embodiment of the present invention.

While this invention is susceptible of embodiment in many different forms, there are shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

According to preferred embodiments of the present invention, a system and method operate to encode and decode data to achieve the highest possible level of fidelity of the decoded data with respect to the original data for a given allocation of bits per sample in the encoded representation.

Further, in the case of image data, a system and method are provided for encoding and decoding images to achieve the highest possible level of fidelity of the decoded image with respect to the original data for a given allocation of bits per sample in the encoded representation.

Further, in the case of image data, a system and method are provided for encoding and decoding images to achieve the highest possible level of fidelity of the decoded image with respect to the original data for a given allocation of bits per sample in the encoded representation without the need to use a computationally intensive quantizing and coding operations to reduce the byte size of the encoded image.

Further a system and method are provided whereby a data set may be encoded once to obtain an encoded representation, and various byte size parts of the encoded representation may be selectively decoded to obtain versions with different levels of fidelity whereby for each byte size part decoded a high level of fidelity to the original data is achieved for the given the byte size of the decoded part relative to the number of samples in the data set.

Further, a system and method are provided whereby a data set may be encoded into a sequenced multi part data structure once, and parts of the multi part data structure can be sequentially decoded to iteratively refine a decoded version of the data set such that after each part of the data structure is decoded and used to refine (update) the decoded version the decoded version will have a high subjective fidelity and/or SNR for the byte size of the parts of the encoded data structure that were decoded.

Further a method and system are provided for encoding images that provides for trading off image quality for encoded byte size that does not involve the computationally intensive process of dequantizing nor the intensive process of decoding.

Further a method and system are provided for encoding and decoding images which will lead to more presentable partially decoded images in the case that a connection through which image data is being transferred is broken.

Exemplary Network According to an Embodiment of the Invention

Referring to FIG. 1 a schematic of the computer network 100 used in connection with an embodiment of the invention is shown. An image source server 102 is connected to the Internet 104 through a first bi-directional data link 106. A wireless network gateway server 108 is connected to the Internet through a second bi-directional data link 110. The wireless network gateway server 108 is connected to a wireless network 112 through a third bi-directional data link 114. The three bi-directional data links 106, 110, and 114 can comprise, for example, wired and wireless communication links such as dedicated lines, Public Switched Telephone Network (PSTN) lines, T1 lines, radio communication links, microwave links, and satellite links. The wireless network comprises a transceiver 116 which establishes a wireless communication channel with a portable wireless communication device 118. The portable wireless communication device 118, in one exemplary application, can comprise a portable wireless client device 118.

The image source server 102 may for example comprise a World Wide Web server which serves HTML documents comprising images. The wireless network gateway server can be a wireless application protocol (WAP) server.

The image source server 102 and the wireless network gateway server 108 may take the form of a standard PC computers, comprising BIOS ROM, RAM, hard drives, keyboard, mouse, display screen, and a removable media drive. The removable media drive may be used to load data encoding and/or decoding software from a computer readable medium 120 for configuring one or both of the servers 102, 108 to perform processes of the present invention described below. The removable media may be for example an optical disk (e.g., CDROM), a magnetic media disk (e.g. 3.5" 1.44 Meg Disk)

Figure 2:
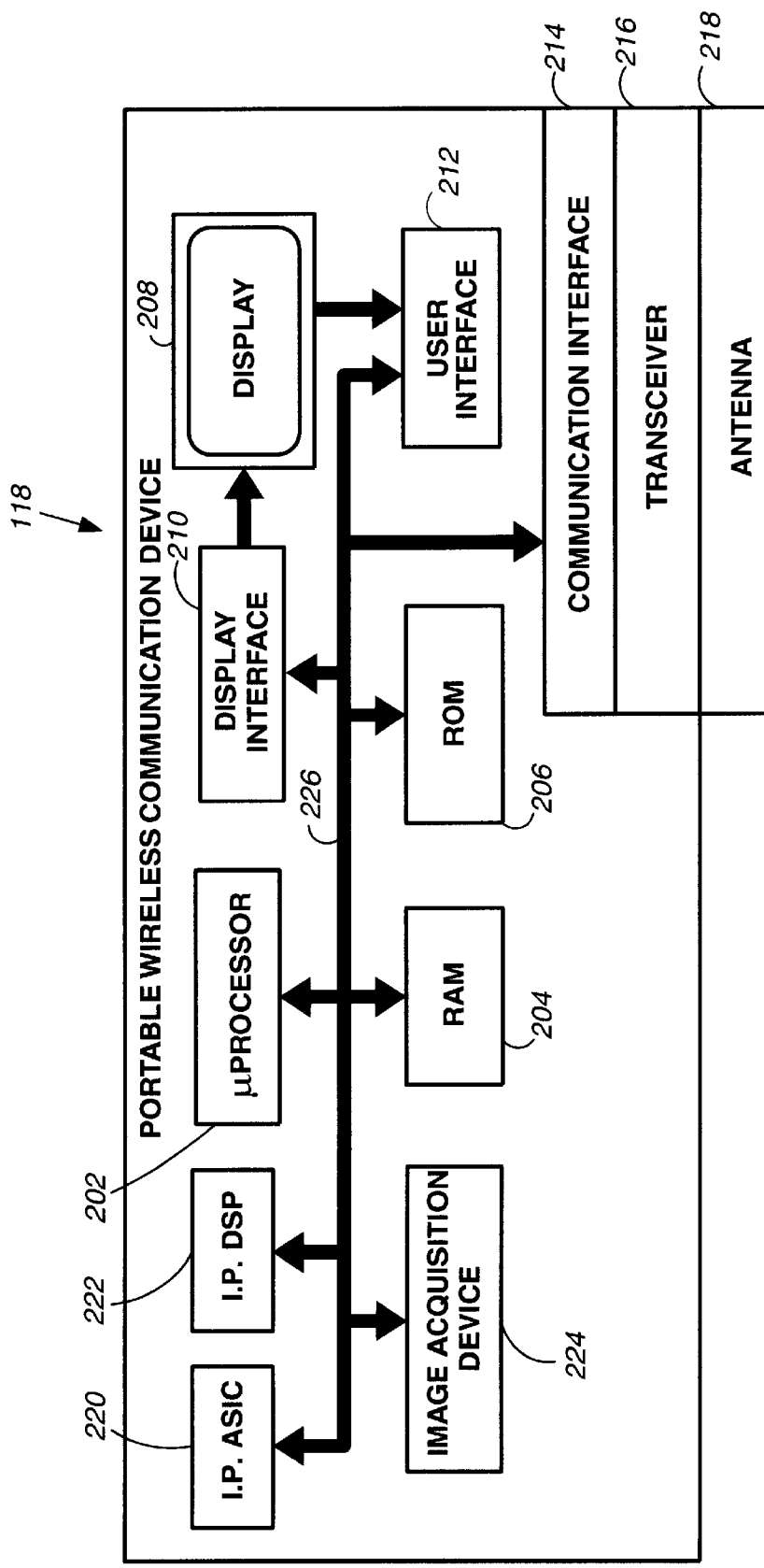
FIG. 2 is a block diagram of a portable wireless communication device shown in FIG. 1 according to a preferred embodiment of the present invention.

Exemplary Portable Wireless Communication Device According to a Preferred Embodiment of the Invention FIG. 2 shows an internal schematic of the portable wireless communication device 118 (FIG. 1) according to an embodiment of the invention. A microprocessor 202 executes programs for decoding images. Random access memory (RAM) 204 provides a workspace for use by the microprocessor 202. Read-only memory (ROM) 206 stores programs for decoding and/or encoding images. A display 208, which is used to display decoded images, is operatively coupled to a display driver 210. A user interface 212 is used for accepting user input, such as a request to view a particular image stored on the image source server 102 (FIG. 1), for further processing a particular region of a display image, or a command to transmit an image to another communication device (not shown). An image processing application-specific integrated circuit (IP ASIC) 220, and an image processing digital signal processor (IP DSP) 222 also provided An image acquisition device 224, which can take the form of a digital camera, is also integrated into the wireless communication device 118.

A communication interface 214, a transceiver 216, and an antenna 218 are also provided.

A bi-directional system bus 226 couples the microprocessor 202, RAM 204, ROM 206, display interface 210, user interface 212, communication interface 214, IP ASIC 220, IP DSP 222, and image acquisition device 224.

The IP ASIC 220, IP DSP 222, and microprocessor 202 can serve as data processing devices. The wireless communication device could be implemented with a sub set of those three units.

Block Diagram of an Image Encoder According to an Embodiment of the Invention

Figure 3:
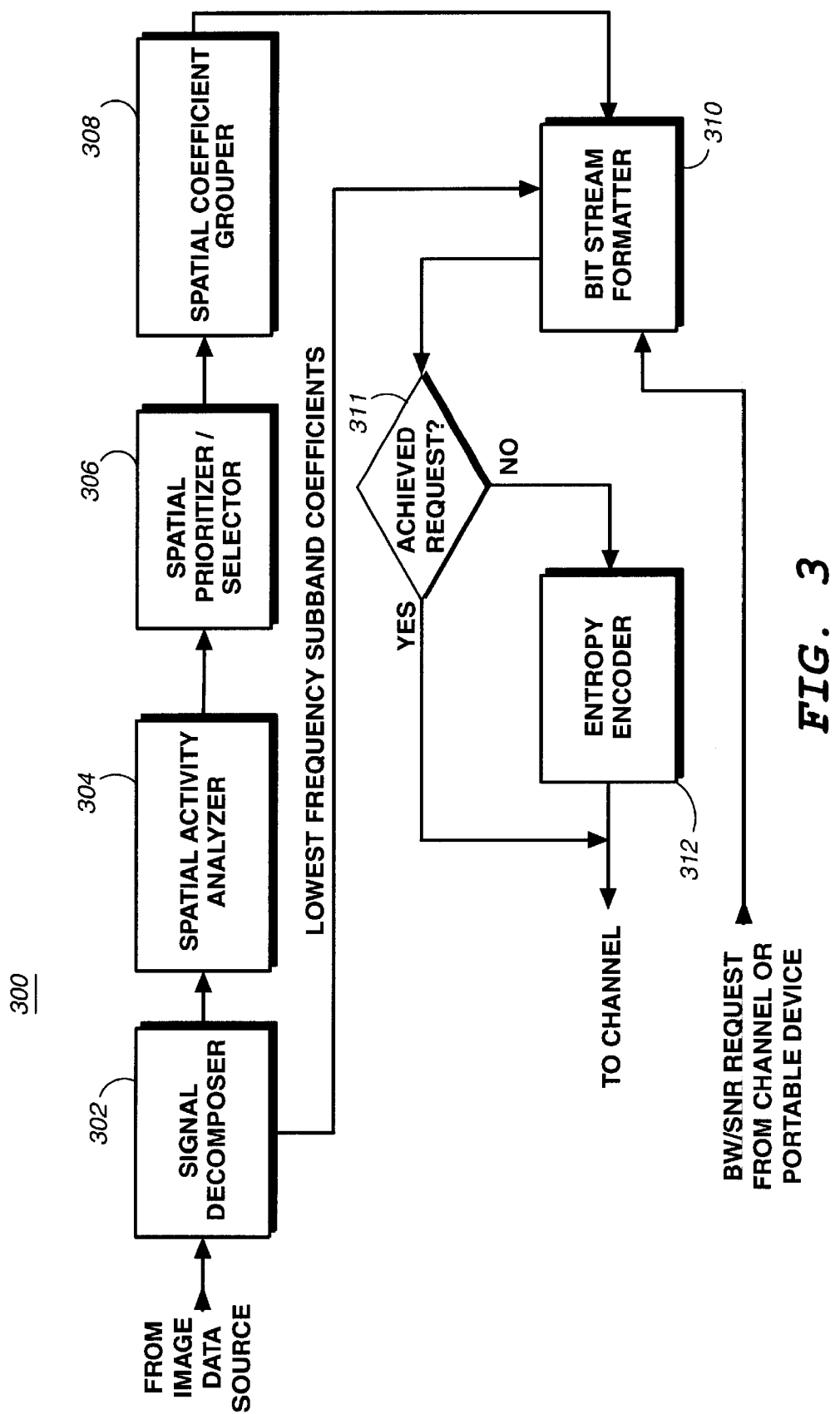
FIG. 3 is a block diagram of an image encoder according to a preferred embodiment of the present invention.

FIG. 3 shows a block diagram of an image encoder 300 according to an embodiment of the invention.

Figure 4:
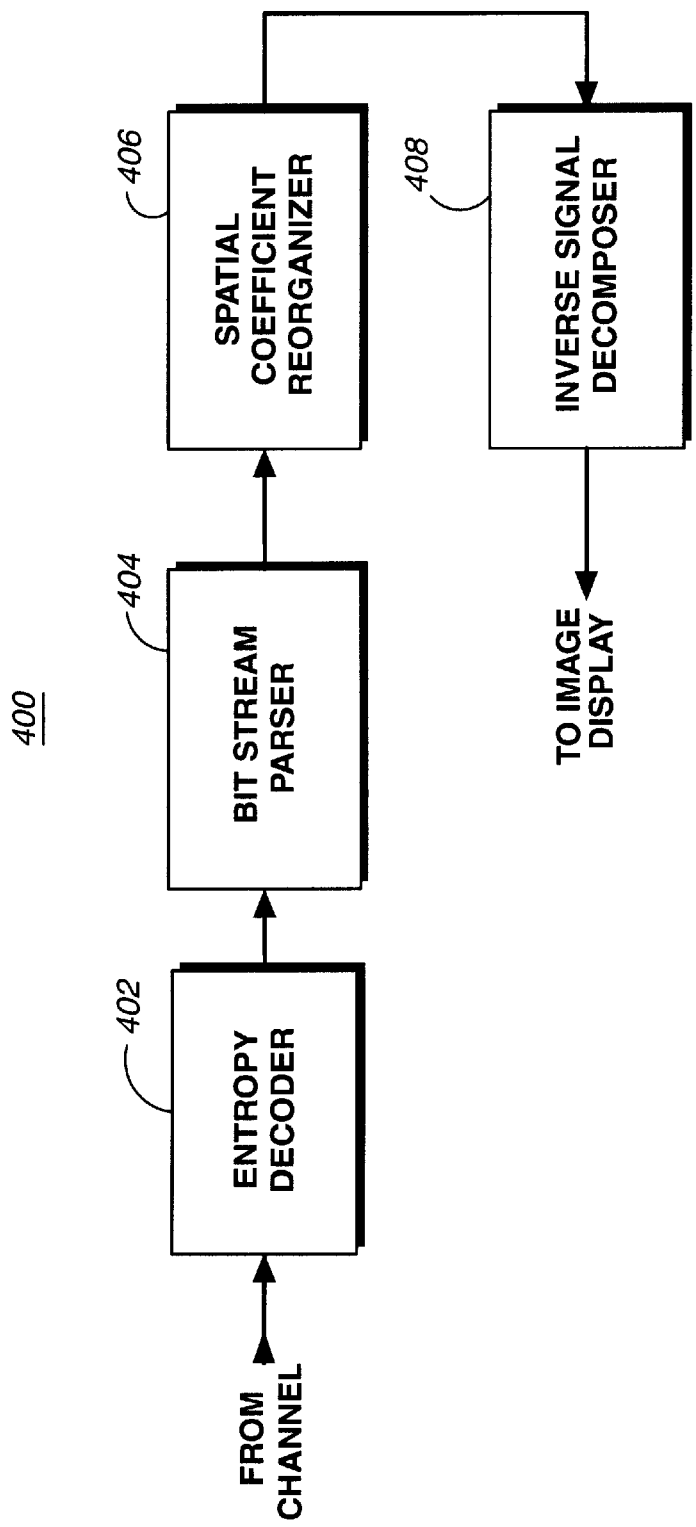
FIG. 4 is a block diagram of an image decoder according to a preferred embodiment of the present invention.

Functional block 302 is a signal decomposer. The signal decomposer is preferably a multilevel wavelet transformer. A wavelet transformer is known to yield high fidelity of a encoded and decoded image to an original image. Another reason which makes the wavelet transformer useful in connection with the present invention is that it is based on basis functions which are localized in a spatial domain the image, i.e. they are compactly supported. The signal decomposer receives an input image from an image data source which can be a directory on a hard drive (not shown), or the image acquisition device 224 (FIG. 2). The signal decomposer outputs a set of transformed data coefficients which can be formatted in a 2-d array (matrix). Each color channel of an image may be processed separately by the signal decomposer and other parts of the encoder 300 and decoder 400 (FIG. 4). Color channels as used in the present application can include but is not limited to one of the following luminance (y), chrominance (Cr, $C_b$).

Functional block 304 is a spatial activity analyzer, which serves to obtain a set of measures of the variations in a color channel over a set of image areas. The set of areas can be discrete in the sense that each measure of variation applies strictly to a region with a sharp boundary. The variations may be characterized by one or a plurality of different length scales. According to specific embodiments disclosed below the spatial activity analyzer deduces measures of variation from a selected set of wavelet transformed data coefficients. Each wavelet transformed data coefficients characterizes variations at one or more length scales. Operations involving one more wavelet transformed data coefficients can be used to obtain an indications of variations at longer length scales.

Functional block 306 is a spatial prioritizer/selector, which serves to select a plurality of subsets of a set of transformed data coefficients, and/or deduce an ordering for a plurality of subsets of coefficients. The selection and/or ordering is based on the measures of variation obtained by the spatial activity analyzer. Each subset of transformed data coefficients that is selected can correspond, i.e., be spatially correlated, with the set of areas over which the spatial activity analyzer obtains measures of variation.

Functional block 308 is a spatial coefficient grouper which serves to collect each of the plurality of subsets of the set of transformed data coefficients into a data structure which we term a 'norm plane' or a 'count plane', in general a priority plane.

Functional block 310 is a bit stream formatter, which serves to prepare the norm or count planes for transmission or recording. In addition to the norm or count planes, the bit stream formatter also receives another data structure comprising a collection of transformed data coefficients corresponding to low spatial frequencies. The same transformed data coefficients are also distributed among the norm planes. Each low spatial frequency transformed data coefficients appear once in the collection of the same, and again a spatially corresponding norm plane. The bit stream formatter 310 outputs formatted encoded data to the channel only if desired channel rate and/or SNR requirements are met at decision block 311. Otherwise, further processing is achieved by entropy coder 312.

The collection of low spatial frequence coefficients, and norm or count planes are serialized and interleaved with demarcation markers in a bit stream. The demarcation markers facilitate parsing the bit stream by a decoder. The collection of transformed data coefficients corresponding to low spatial frequencies will be placed into the bit stream first so that it will be received by a receiving decoder first. After receiving the collection of transformed data coefficients corresponding to low spatial frequencies, the decoder can reconstruct a low fidelity version of the image.

Functional block 312 is an entropy encoder which can be an arithmetic coder or a huffman encoder. Entropy encoders are known in the art, and will not be described herein.

In the case of audio signal applications of the invention, the spatial activity 304 would be replaced by a temporal activity analyzer since the natural domain of an audio signal is time rather than space coordinate. Other functional blocks in the encoder 300 would also have corresponding temporal analogues in the case of audio signal processing.

In the case that an image encoder 300 is implemented on the wireless communication device 118 (FIG. 1), the transceiver (216 FIG. 2) can be used to transmit the bit stream generated by the bit stream formatter 310, or an output of the entropy encoder if that is also implemented in the communication device 118 (FIG. 1).

In the encoder 300, note the absence of a quantizer and an entropy coder preceding the bit stream formatter 310. The invention achieves high fidelity in consideration of the byte size of the norm planes encoded and decoded, by inter alia grouping the coefficients into norm planes and ordering and/or selecting a plurality of the norm planes. Therefore, quantizing in order to further reduce the byte size and reduce the image transmission time can be eliminated. Dispensing with the quantizing has the additional advantage vis a vis time considerations that the computationally intensive task of dequantizing, which in the case a wireless system is likely to be performed by a low clock rate low processing power communication device can be eliminated. For applications involving low processing power wireless communication devices 118, and higher bandwidth, the entropy encoder 312 could be dispensed with to avoid the necessity of carrying out entropy decoding by the wireless communication device 118.

In the prior art, entropy coders operate on the entire quantized decomposed image, thus, making the computational intensity of these entropy coders to be high. The advantage of system 300 is that the simple low intensity computational activity analyzer allows either:

1) a system that does not require entropy coding or any further coding; such as for wider bandwidth channels; or
2) less complex entropy coders for systems with narrow bandwidth channels.

As an alternative to running software embodying the functional blocks shown in FIG. 3 on a single computer, preferably the image source server 102 (FIG. 1), they may be distributed across multiple computers. An alternative distribution is as follows. The signal decomposer may be run on the image source server 102 (FIG. 1). Alternatively the signal decomposer can be run another computer (not shown) which receives data from an image input device (e.g., digital camera, flat bed scanner, (not shown)), and the output of the signal decomposer then transferred to the image source server 102. The remaining functional blocks shown in FIG. 3 may be run on the wireless network gateway server. In this distributed arrangement further functional blocks such as entropy encoders and decoders, quantizers, dequantizers and network communication processes (not shown) can intercede between the signal decomposer 302 and the spatial activity analyzer. The distributed arrangement has the following advantage. A wireless Internet service provider can implement functional blocks 304, 306, 308, and 310 on a wireless network gateway server 108 which they own in order to provide high quality and reduced byte size images (hence faster downloads) to their customers, without imposing limitations what Internet servers (represented by image source server 102) their customers can access. The foregoing arrangement constitutes a transcoder.

Block Diagram of an Image Decoder According to an Embodiment of the Invention

Referring to FIG. 4 a block diagram of an image decoder 400 is shown. An entropy decoder 402 receives an entropy encoded bit stream output by entropy encoder 312 (FIG. 3) and performs the corresponding inverse process to obtain a duplicate of the bit stream generated by the bit stream formatter 310 (FIG. 3).

A bit stream parser 404 separates out the collection of transformed data coefficients corresponding to low spatial frequencies, and the norm or count planes. In doing so the bit stream parser 404 may employ the aforementioned demarcation markers.

A spatial coefficient reorganizer 406 arranges coefficients extracted from the norm plane into an arrangement suitable for input to the inverses signal decomposer 408.

According to one embodiment of the invention, described below in more detail, a norm plane order is determined by the spatial prioritizer 306 (FIG. 3) in accordance with measures of variation over different areas which is based on analysis of the collection of transformed data coefficients corresponding to low spatial frequencies. In the foregoing embodiment, the spatial reorganizer 406 deduces which image area each norm plane is associated with, by performing the same analysis as the spatial activity analyzer, 304 (FIG. 3) and spatial prioritizer 306 (FIG. 3). Hence, the norm planes could be formatted into the bitstream in an order which depends on their associated measure of activity, and hence their importance in conveying image information (as to opposed to a simple raster like order), and yet the decoder would be able to determine the proper spatial association of each norm plane.

Process block 408 performs as an inverse signal decomposer using coefficients extracted from the norm planes as input. Inverse signal decomposers are known to persons of ordinary skill in the image processing art. According to the instant invention, it is preferred that the inverse signal decomposer process the collection of transformed data coefficients corresponding to low spatial frequencies first, in order to obtain a low resolution image for display in a short time. Subsequently, the inverse signal decomposer can process successive norm planes in the bit stream to obtain progressively higher image resolution.

Parts of the encoder 300 (FIG. 3), and decoder 400 (FIG. 4)can be implemented in the form of software which can be stored on computer readable medium 120 (FIG. 1), ROM 206 (FIG. 2), or temporarily in RAM 204 (FIG. 2), or they can be implemented by IP ASIC 220 (FIG. 2) or IP DSP 222 (FIG. 2).

Data Structure of Coefficients Output by Signal Decomposer

Figure 5:
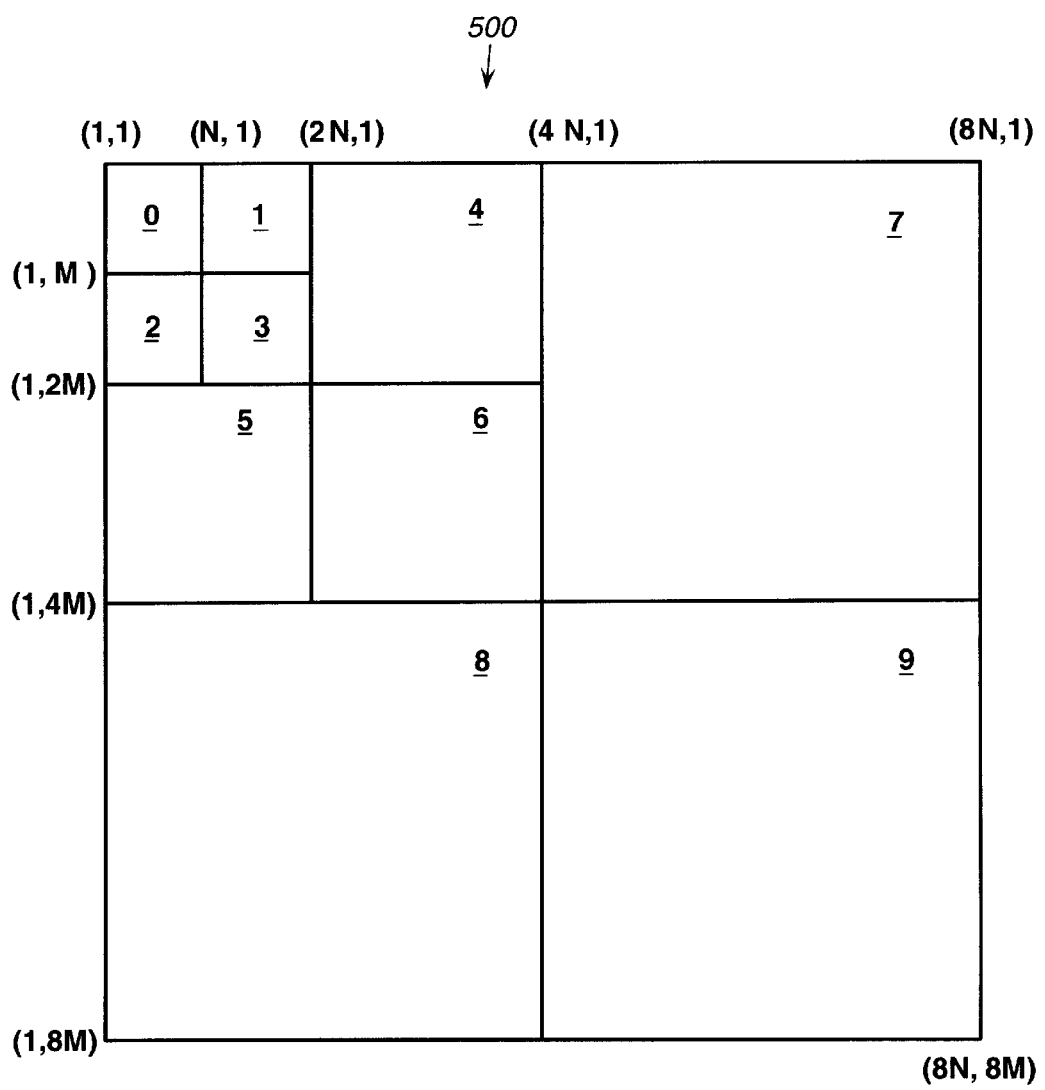
FIG. 5 is an exemplary data structure representation of the output from a three level discrete wavelet transformation.

FIG. 5 is a schematic representation of a 8N by 8M matrix of transformed data coefficients 500 output by a three level discreet wavelet type signal decomposer which according to the preferred embodiment is the type of signal decomposer 302 used. The form of the schematic shown in FIG. 5 is known to workers of ordinary skill in the image processing art. The schematic shows 10 sub band sub matrices labeled with underlined reference numerals 0–9 and having rectangular borders as seen in the FIG. Sub band sub matrix 0 contains coefficients corresponding low spatial frequency information. The coordinates (index pairs) of the upper left points of some of the sub matrixes are written along the top and left edges in terms of N and M. From these, the coordinates of the upper left points of the remaining sub matrices can be construed.

According to an embodiment of the invention sub matrix 0 is divided into blocks of two by two transformed data coefficients. Each of block of two by two coefficients is spatially correlated to a particular block of pixels of an input image from which the coefficient matrix is derived by applying the wavelet type signal decomposer. For example in the case of 3 level wavelet transform each block of 2 by 2 transformed data coefficients in sub band sub matrices 0,1,2, or 3 corresponds to an block of 16 by 16 pixels in the input image. Furthermore, according to the preferred embodiment of the invention each block of 2 by 2 transformed data coefficients from the 0 sub band sub matrix is grouped by the spatial coefficient grouper 308 with spatially correlated transformed data coefficients selected from all of the other sub band sub matrices. The latter grouping of coefficients is the aforementioned norm plane according to the preferred embodiment. A specification of the members of a norm plane selected from the coefficient matrix 500 follows. A block of 2 by 2 coefficients from the 0 sub band sub matrix can be identified by the matrix indices of its upper left member written as (n,m) where n indicates the column of the transformed data coefficient, and m indicates its row. In the following specification the transformed data coefficients which comprise a norm plane associated with transformed coefficient (n,m) in sub band sub matrix 0 are indicated in terms of n and m referenced with respect to the upper lefthand member, of the sub band sub matrix in which they appear. (As opposed to being referenced with respect to the upper left hand transform coefficient of the whole matrix 500.) For 0,1,2, and 3 sub band sub matrices, the transformed data coefficients are $$[(n,m), (n+1,m), (n,m+1), (n+1,m+1)],$$

for the 4, 5, and 6 sub band sub matrices, the transformed data coefficients are $$[2n-1:2n+2, 2m-1:2m+2], \text{ and}$$

for the 7,8, and 9 sub band sub matrices the transformed data coefficients are $$[4n-3:4n+4, 4m-3:4m+4].$$

For each sub band sub matrix the expression for the transformed data coefficients that are in the norm plane are written in terms of n and m where the upper left member of the sub band sub matrix is taken as (1,1) for the purpose of the expressions). The indices of these upper left hand members of each sub band sub matrix, in the index system for the entire transformed data coefficient matrix 500 is given in terms in capital N, M and can be construed from FIG. 5.

Thus, for each of the 4, 5, and 6 sub band sub matrices, there is a block of 4 by 4 transformed data coefficients, and for each of the 7, 8 and 9 sub band sub matrices there is a block of 8 by 8 transformed data coefficients. Each norm plane can be arranged as a 16 by 16 norm plane matrix or can be serialized (in a predetermined order) into a stream of 256 transformed data coefficients, for the case of a three level discrete wavelet transform.

Flow Diagram for Spatial Activity Analyzer

Figure 6:
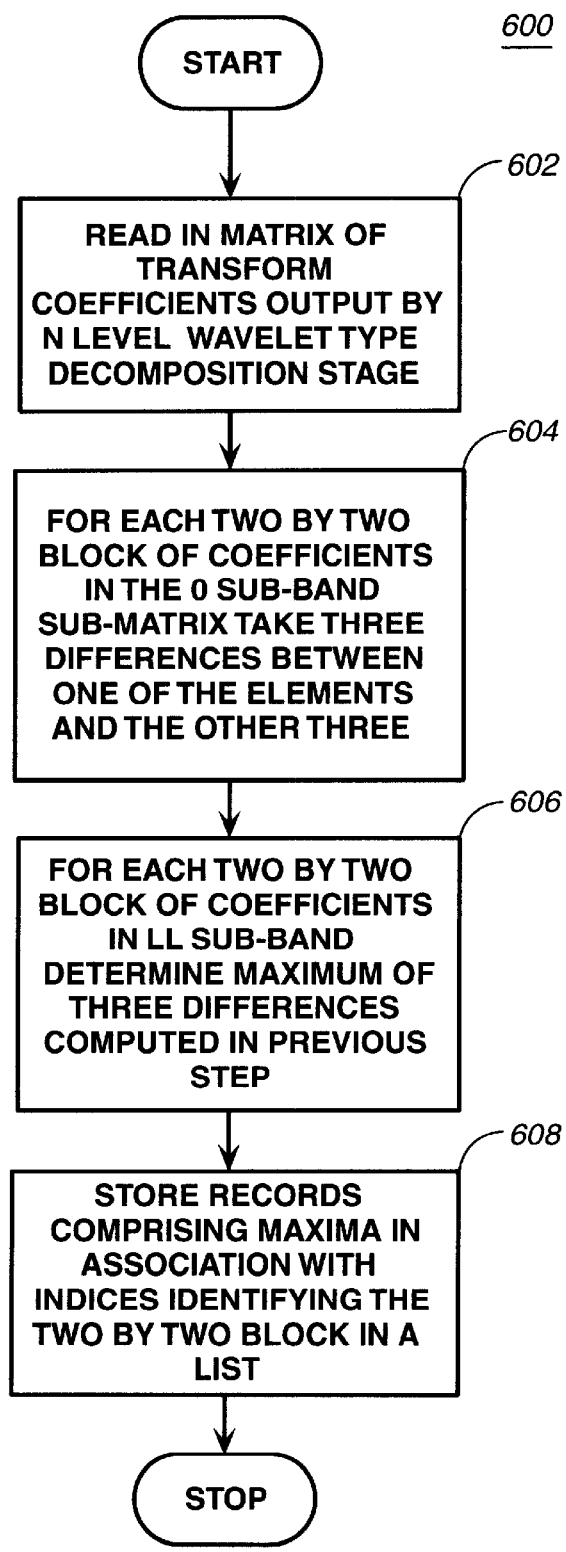
FIG. 6 is a flow diagram of a process performed by the spatial activity analyzer shown in FIG. 3 according to a preferred embodiment of the invention.

Referring to FIG. 6 a flow diagram of a process 600 performed by the spatial activity analyzer 306 (FIG. 3) is shown. In process block 602 the matrix 500 (FIG. 5) of transformed data coefficients output by an N level wavelet type signal decomposer (an embodiment of signal decomposer 302 (FIG. 3)) is read.

In process block 604 for each block of two by two transformed data coefficients in sub band sub matrix 0 a set of three differences are taken between the upper left hand transformed data coefficient and the other three transformed data coefficients in the block of two by two. The choice to include the upper left transformed data coefficient in all three differences as opposed to one of the other three is arbitrary.

In process block 606 for each block of two by two transformed data coefficients, the maximum of the three differences computed in the previous step is determined.

In process block 608 records comprising the maximum for each 2 by 2 block in association with indexes identifying the two by two block are stored in a list.

In the case of color images the matrix 500 which the spatial activity analyzer analyzes would correspond to one particular color channel. There will be separate matrices 500 for each color channel and each will be processed separately.

Functional Description of Spatial Prioritizer/Selector

Figure 7:
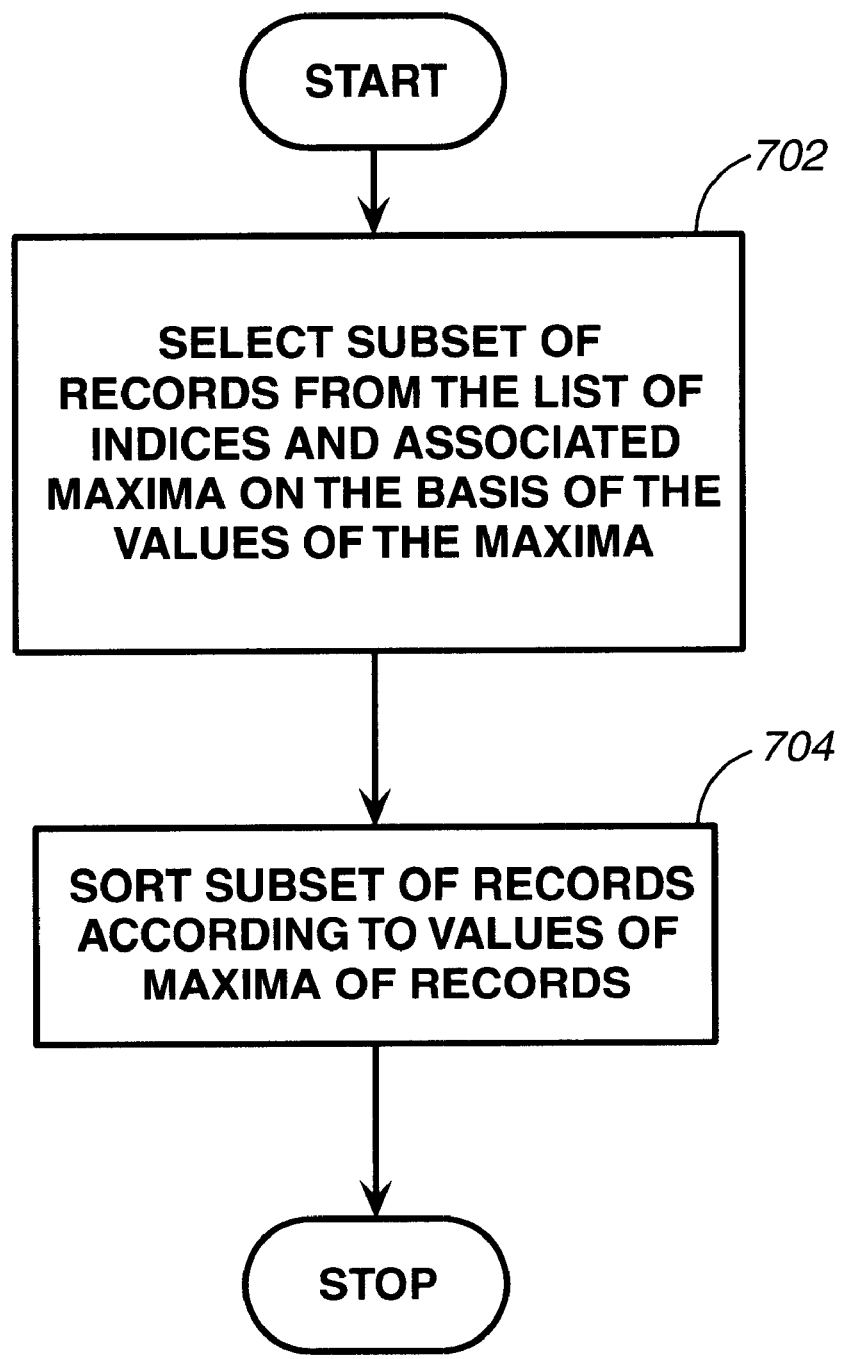
FIG. 7 is a flow diagram of a process performed by the spatial prioritizer/selector shown in FIG. 3 according to a preferred embodiment of the invention.

Referring to FIG. 7 a flow diagram of a process 700 performed by the spatial prioritizer /selector 306 (FIG. 3) is shown. In process block 702 a subset of records from the list of indices and associated maxima that was stored in process block 608 (FIG. 6) is selected on the basis of the values of the maxima. All the records for which the maximum exceeds a predetermined threshold can be selected. Alternatively, the first preselected number of records taken in descending order according the maximum value can be selected. It is also possible that process block 702 is effectively eliminated by allowing the subset to be equal in size to the number of records in the list.

In process block 704, the subset of records selected in process block 702 is sorted according to the values of the maxima. A quick sort algorithm can be used to perform the sort.

The selection performed in process block 702, and the sort performed process block 704 are later used to determine which norm planes will be sent to a decoder and in what order. Ordering the norm planes by itself insures that the information which is more important in determining image quality is received by the decoder first so that the decoder can present a better quality image faster. Selecting norm planes by itself, insures that the decoded image will have high quality relative to the byte size of the image encoded, transmitted, and decoded, so that high quality images can be transmitted quickly over a low bandwidth data link, and decoded quickly by a low processing power communication device.

Functional Description of Spatial Coefficient Grouper

Figure 8:
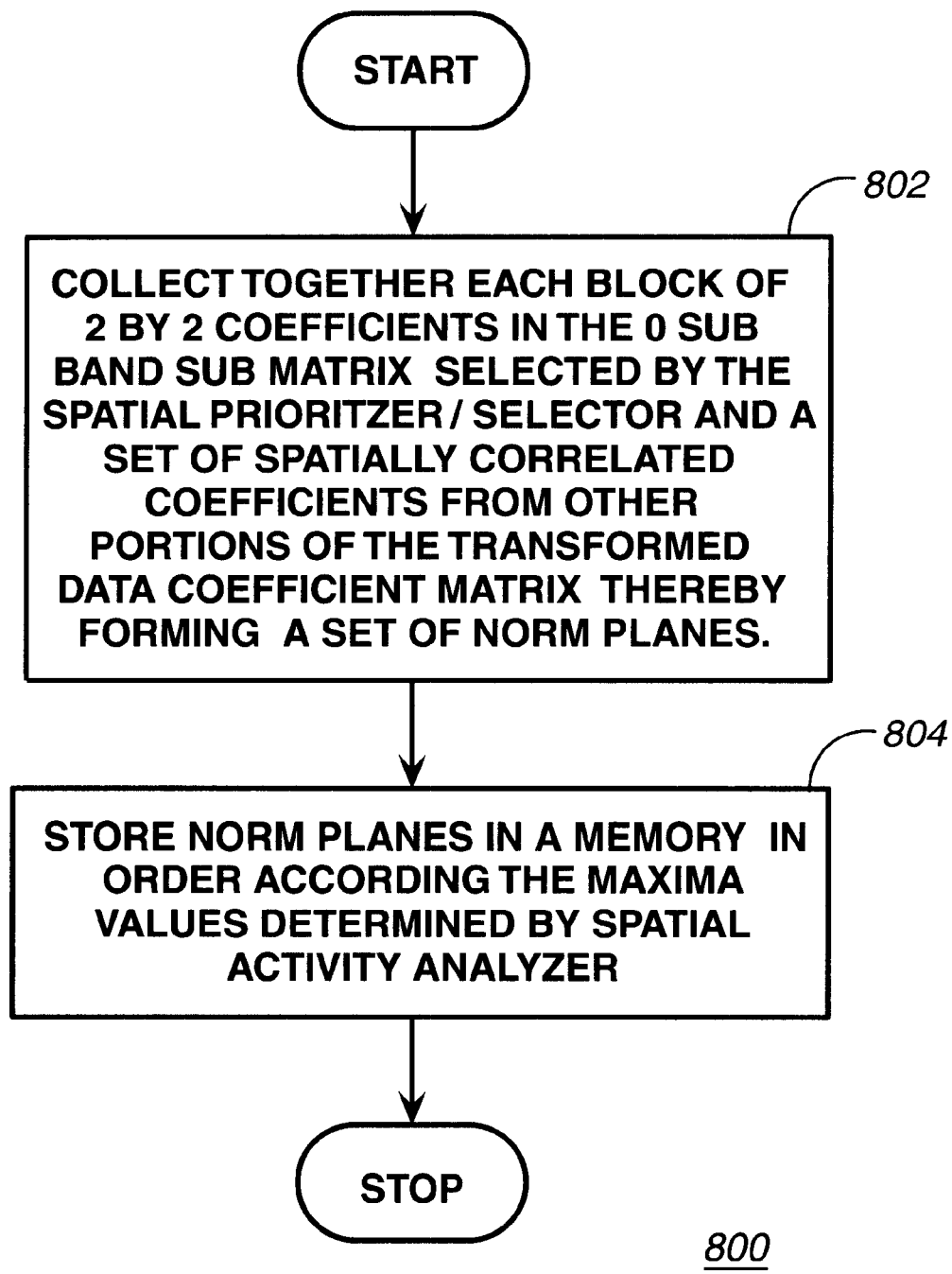
FIG. 8 is a flow diagram of a process performed by the spatial coefficient grouper shown in FIG. 3 according to a preferred embodiment of the invention.

Referring to FIG. 8 a flow diagram of a process 800 performed by the spatial coefficient grouper 308 (FIG. 3) according to an embodiment of the invention is shown.

In process block 802 a plurality of subsets of transformed data coefficients are collected together from the transformed coefficient matrix 500 (FIG. 5). The plurality of subsets corresponds by inclusion of the identified two by two block to the subset of records selected by the spatial prioritizer selector 306 (FIG. 3) in process block 702 (FIG. 7). Each subset (norm plane) comprises a block of two by two transformed data coefficients from sub band sub matrix 0 and a collection of spatially correlated transformed data coefficients from the remaining sub band sub matrices 1–9 of transformed data coefficient matrix 500. The set of spatially correlated transformed data coefficients for a given two by two block in sub band sub matrix 0 of a 3 level wavelet transform is specified above in the description of FIG. 5.

In process block 804 the norm planes are stored in memory in order following an order derived for the two by two blocks by the spatial prioritizer/selector 306 (FIG. 3) in process block 704.

The processes performed by the spatial activity analyzer 204 (FIG. 2) and the spatial prioritizer/selector 206 (FIG. 2) can be reorganized and the results of these process achieved in an alternative way.

Functional Description of Bit Stream Formatter

Figure 9:
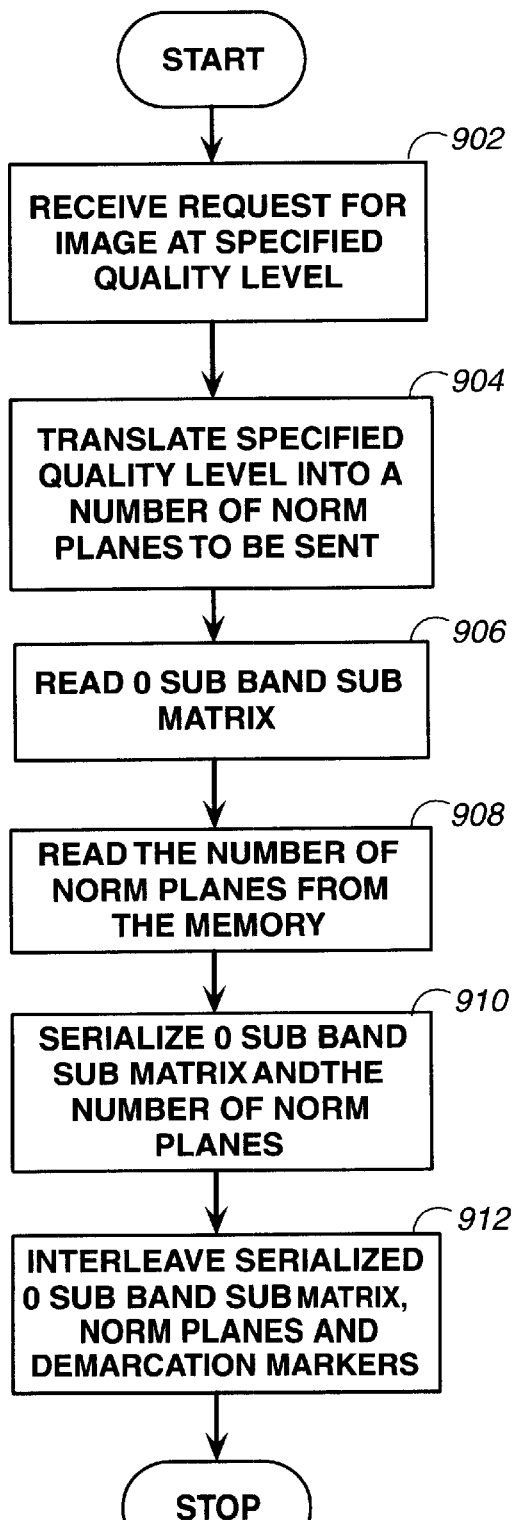
FIG. 9 is a flow diagram of a process performed by the bit stream formatter shown in FIG. 3 according to a preferred embodiment of the invention.

Referring to FIG. 9 a flow diagram of a process 900 performed by the bit stream formatter 310 (FIG. 3) according to an embodiment of the invention is shown.

In process block 902 a request for an image at a specified quality level is received. The request could for example take the form of a Hyper Text Transfer Protocol (HTTP) request. The Universal Resource Identifier (URI) specified in the HTTP request could point to a common gateway interface (CGI) program which serves as a communication module for the bits stream formatter. The URI could include appended data which specifies the quality level by key word or number. The URI could be carried by a Wireless Application Protocol (WAP) request between the wireless communication device 118 (FIG. 1) and the wireless gateway server 108 (FIG. 1).

In the case of a transcoder implementation the bit stream formatter 310 could automatically select the number of norm planes based on information on available bandwidth and the display 208 resolution.

In process block 904 the quality level and/or system bandwidth is translated into a number of norm planes to be sent to a requesting communication device 118 (FIG. 1, 2). For example the quality level could be specified as a number between 1 and 5 and from this number the fraction of a total number of norm planes stored in process block 804 (FIG. 8) to be sent cab be determined.

For example, by the following formula:

$$NPS = TNN * (QL/5)$$

where NPS is the number of norm planes sent

TNN is the total number of norm planes stored in process block 804 (FIG. 8)

QL is the quality level received in process block 902.

In process block 906 the 0 sub band sub matrix (FIG. 5) is read.

In process block 908 the number of norm planes as determined in process block 904 are read from the memory in which they were stored in process block 804 (FIG. 8)

In process block 910 the transformed data coefficients in sub band sub matrix 0 and the number of norm planes are serialized.

In process block 912 the transformed data coefficients from sub band sub matrix 0, and the subsets of transformed data coefficients from the norm planes are interleaved with demarcation markers in a bit stream. The transformed data coefficients from the 0 sub band sub matrix are placed into the bit stream first, so that they will be received first by the decoder.

The bit stream produced by the bit stream formatter 310 (FIG. 3) can then be passed to lower level communication services, for transmission over a communication channel, e.g., through the wireless network 112 to a wireless communication device 118.

Note that the process accomplished by the spatial activity analyzer 204, spatial prioritizer 206 and spatial coefficient grouper 208 (all in FIG. 2) is useful without encoding the norm planes into a bit stream. The norm planes need not be transmitted in serially they can for example be sent using a parallel data link for example. The norm planes need not be transmitted at all, they can be stored as matrices or otherwise on a CDROM for example.

Flow Diagram of a Bit Stream Parser

Figure 10:
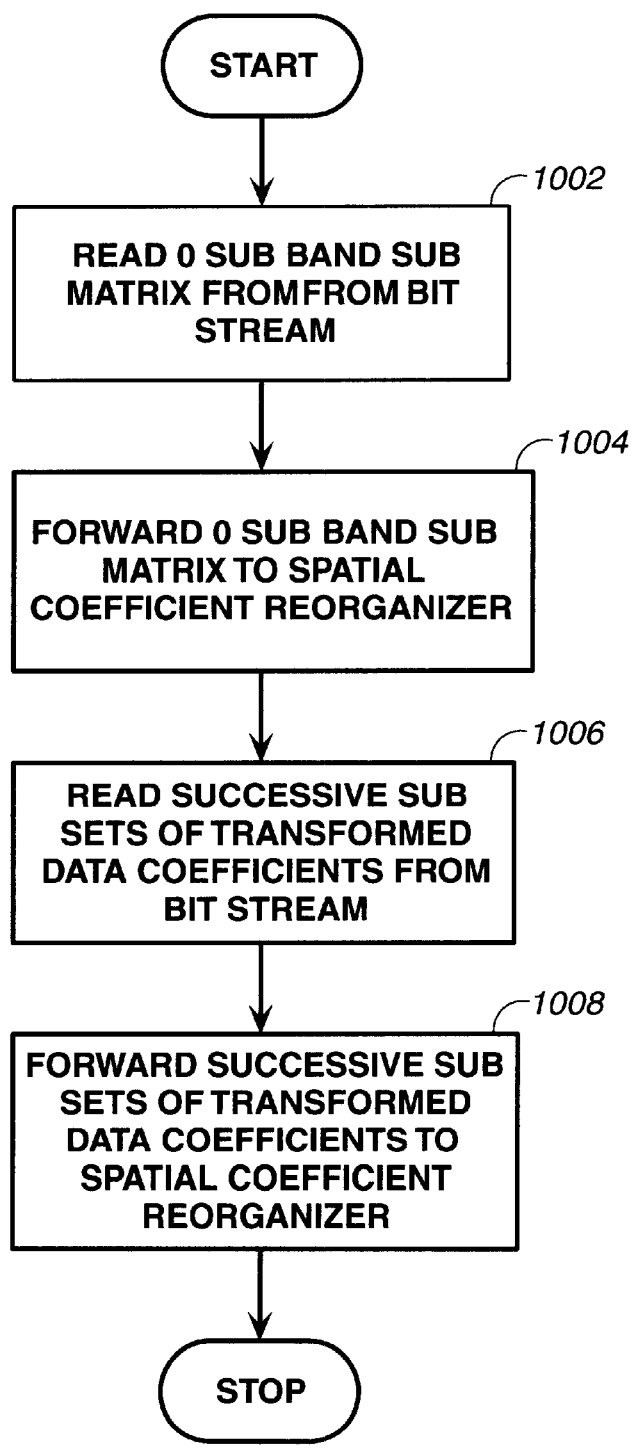
FIG. 10 is a flow diagram of a process performed by the bit stream parser shown in FIG. 4 according to a preferred embodiment of the invention.

Referring to FIG. 10 a flow diagram of process 1000 performed by a bit stream parser 404 (FIG. 4) is shown.

In process block 1002 sub band sub matrix 0 (FIG. 5) is read from the bit stream.

In process block 1004, sub band sub matrix 0 is forwarded to the spatial coefficient grouper 406 (FIG. 4). In process block 1006 successive subsets of transformed data coefficients corresponding to norm planes are read from the bit stream. In process block 1008 successive sets of transformed data coefficients are forwarded to the spatial coefficient reorganizer 406 (FIG. 4). Note that a group of one or more successive subsets of transformed data coefficients can be read out of the bit stream before the group is forwarded to the spatial coefficient reorganizer.

Because the norm planes with the highest activity are entered into the bit stream and extracted first, and because they are in general spatially distributed around the image, in case a connection through which the encoded image is broken, the fidelity of the decoded image based on the norm planes received up to the break will be higher and will not contain a distinct horizontal boundary between a high fidelity area and a lower fidelity area.

Flow Diagram of a Spatial Coefficient Reorganizer

Figure 11:
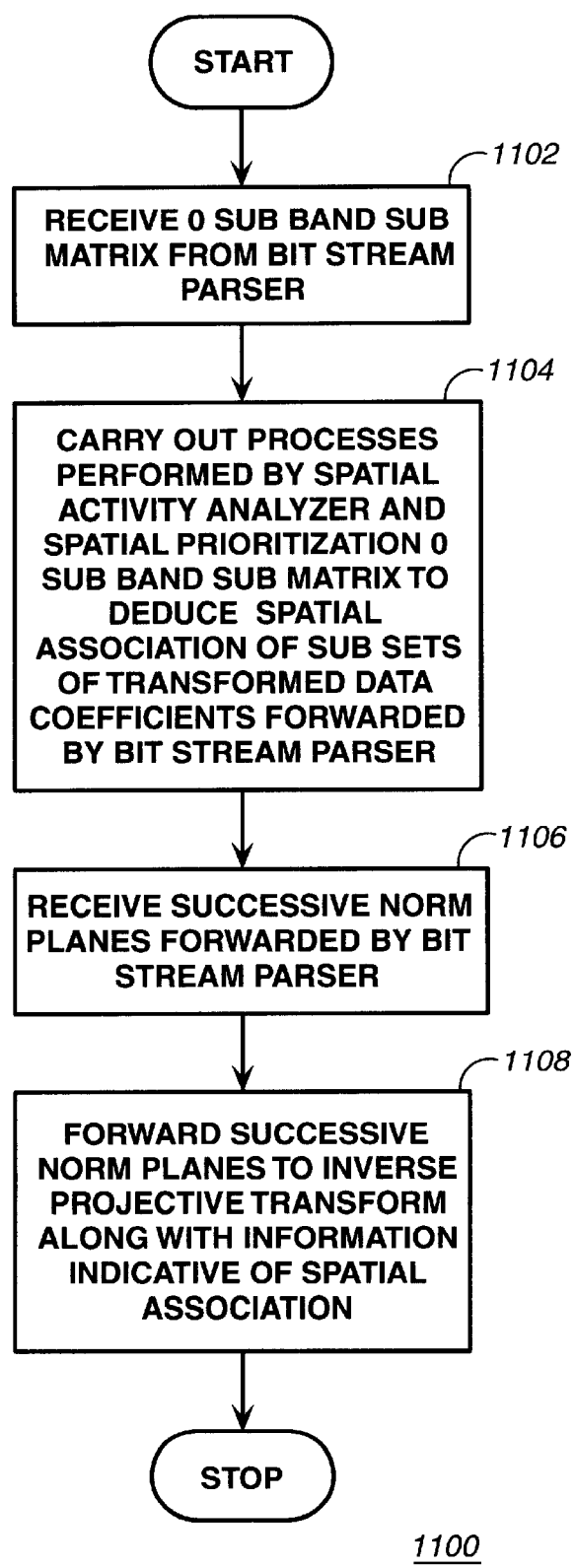
FIG. 11 is a flow diagram of a process performed by the spatial coefficient reorganizer shown in FIG. 4 according to a preferred embodiment of the invention.

Referring to FIG. 11 a flow diagram of a process 1100 performed by a spatial coefficient reorganizer 406 (FIG. 4) is shown.

In process block 1102 sub band sub matrix 0 (FIG. 5) is received from the bit stream parser 404 (FIG. 4) after having been forwarded in process block 1004 (FIG. 10).

In process block 1104 process 600 (FIG. 6) performed by the spatial activity analyzer 304 (FIG. 3) and process 700 (FIG. 7) performed by the spatial prioritizer selector 306 (FIG. 3) is repeated by the spatial coefficient reorganizer 406. The purpose of doing so is to determine on the decoder side the order in which the subsets of transformed data coefficients (norm) planes were encoded into the bit stream. By doing so the spatial association of each norm plane is deduced because sub band sub matrix 0 has a definite spatial arrangement which is preserved in transmission.

In process block 1106 successive norm planes which were forwarded by the bit stream parser 404 (FIG. 4) in process block 1008 (FIG. 10) are received by the spatial coefficient reorganizer 406.

In process block 1108 successive norm planes are forwarded to the inverse projective transform along with information indicative of each norm planes spatial association.

With the information indicative of the spatial association, coefficients extracted from each norm plane can be correctly placed in an input matrix for the inverse projective transform.

Functional Description of a Spatial Activity
Analyzer According to a Second Embodiment Referring to FIG. 12A a process 1200 performed by a spatial activity analyzer 304 (FIG. 3) according to a second embodiment of the invention is shown. In process block 1202 for each 8 by 8 block of transformed data coefficients in the 7, 8, and 9 sub band sub of three color channel specific, three level wavelet transform coefficient matrices 500 (FIG. 5), a count of the number of transformed data coefficients for which the absolute value exceeds a first predetermined threshold is obtained.

In process block 1204, for each of the aforementioned 8 by 8 blocks, the count of the number of transformed data coefficients that exceeded a predetermined count threshold is determined.

The first predetermined threshold value and the predetermined count value can be set independently for each color channel in the case of color images. In implementations carried out to date by the inventors, they have been set to the same two values for all three color channels.

The first predetermined threshold value and the predetermined count threshold can be adjusted to affect the fidelity of the encoded and decoded image to the original and the byte size of the encoded image. Decreasing the either threshold will increase the fidelity, but also increase the byte size of the encoded image.

The table below gives some examples of subjective image quality obtained with various combinations of choices of first predetermined threshold value and predetermined count threshold.

| FIRST PRE-DETERMINED THRESHOLD | PRE-DETERMINED COUNT THRESHOLD | OUTPUT BYTE SIZE WITH REFERENCE INPUT = '18 VGA COLOR IMAGE | SUBJECTIVE QUALITY |
| --- | --- | --- | --- |
| 50 | 60 | 4300 | ACCEPTABLE |
| 25 | 5 | 8004 | VERY GOOD |
| 16 | 5 | 8845 | VERY GOOD |
| 16 | 2 | 10670 | EXCELLENT |

In process block 1206 each 8 by 8 block for which the count exceeded the predetermined count threshold is flagged, i.e., a record is made of it.

A representation of the record can take the form of a binary sequence in which each digit corresponds to a particular 8 by 8 block, and the value of the digit indicates whether the 8 by 8 block was flagged. This sequence is termed a flag sequence. According to an alternative preferred embodiment there is a separate flag sequence for each color channel.

In process block 1208 a plurality of records each comprising identifiers for each 8 by 8 block and a count for each 8 by 8 block are stored in memory. The records can be stored sequentially after each count is made.

Figure 13:
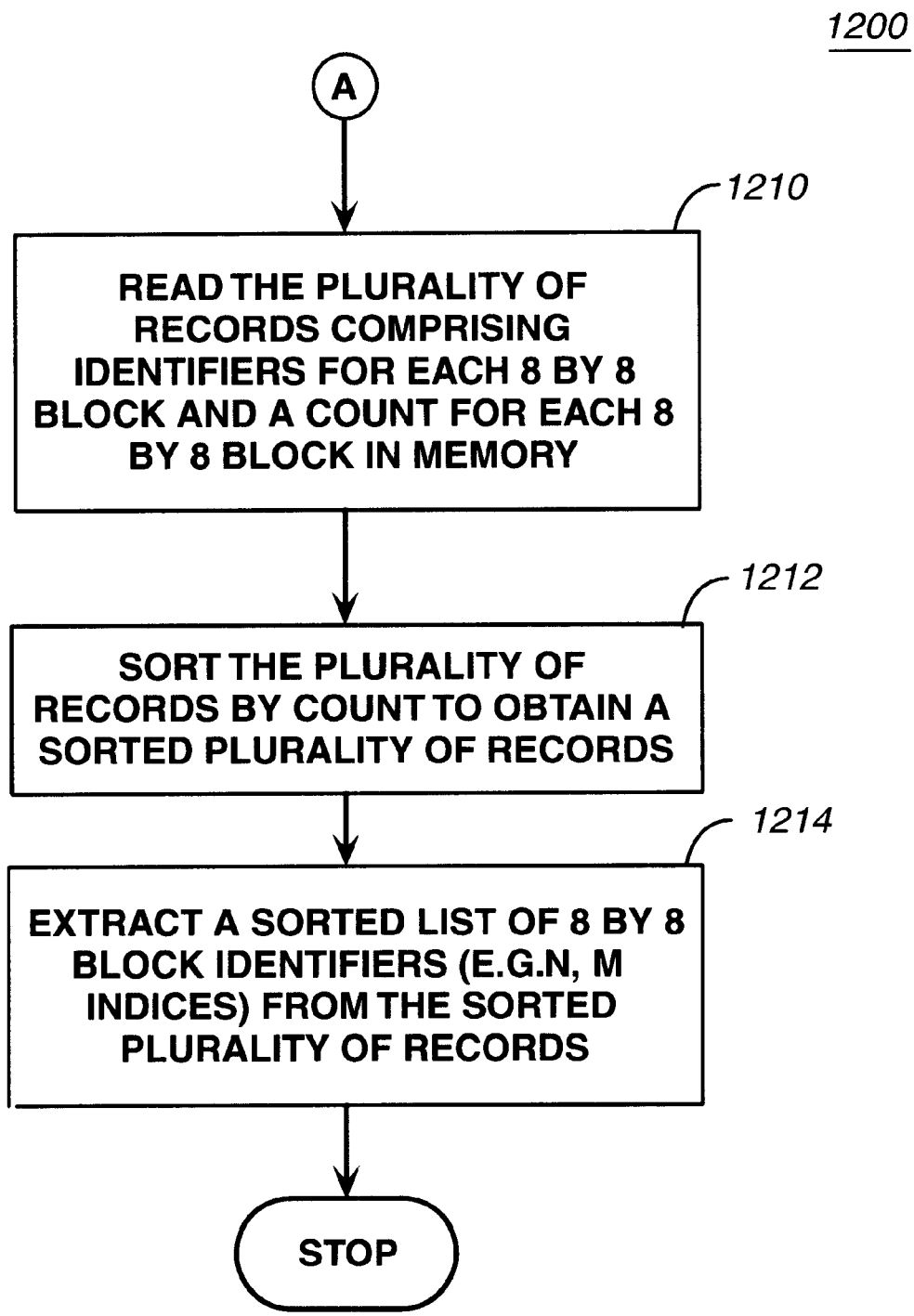
FIG. 13 is a second portion of a flow diagram of a process performed by the spatial activity analyzer shown in FIG. 3, according to an alternative preferred embodiment of the present invention.

Turning now to FIG. 13, the process 1200 continues with process block 1210 in which the plurality of records stored in process block 1208 are read.

In process block 1212 the plurality of records are sorted by count to obtain a sorted plurality of records. A quick sort algorithm could be used.

In process block 1214 a sorted list of 8 by 8 block identifiers from the sorted plurality of records is extracted. The identifier for each 8 by 8 block in the sorted plurality of 8 by 8 blocks can take the form of a pair of indexes corresponding to the upper left member of the 8 by 8 block in index system of the transformed data coefficient matrix 500 (FIG. 5).

Note that rather than analyzing the 8 by 8 blocks in sub band sub matrices 7, 8, and 9, the same type of analysis could be based on other blocks in other sub band sub matrices. For example 4 by 4 blocks of sub band sub matrices 4,5, and 6 can be examined.

The values first predetermined threshold and/or the predetermined count threshold can varied across the image. For example lower values can be used towards the center of the image which is likely to be of greater interest. Alternatively as discussed in connection with FIG. 18 below the values can be varied in accordance with a user specified region of interest.

Figure 14:
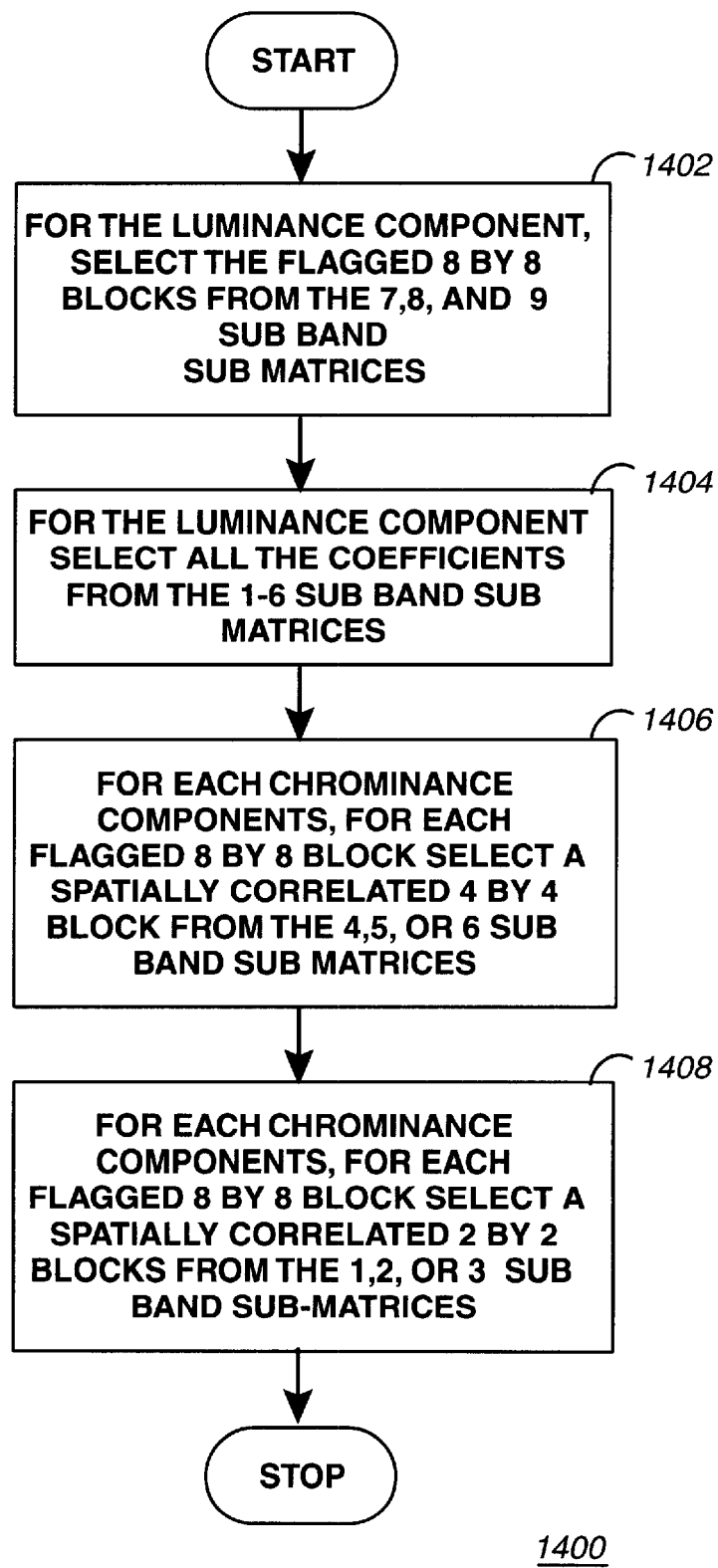
FIG. 14 is a flow diagram of a process performed by the spatial prioritizer/selector shown in FIG. 3, according to an alternative preferred embodiment of the invention.

Functional Description of a Spatial Prioritizer/
Selector According to an Alternative Preferred
Embodiment Referring to FIG. 14, a flow diagram of 1400 of a process performed by the spatial prioritizer/selector 306 (FIG. 3) according to the alternative preferred embodiment of the invention is shown.

In process block 1402, the 8 by 8 block in the 7,8, and 9 sub band sub matrices of a luminance component transformed data coefficient matrix 500 (FIG. 5), which were flagged in process block 1206 are selected.

In process block 1404 all the transformed data coefficients in the 1–6 sub band sub matrices of the luminance component transformed data coefficient matrix 500 (FIG. 5) are selected.

In process block 1406 for each of two chrominance transformed data coefficient matrices 500 (FIG. 5), for each flagged 8 by 8 block a spatially correlated 4 by 4 blocks from the 4,5, or 6 sub band sub matrices is selected.

In process block 1408 for each of the two chrominance transformed data coefficient matrices 500 (FIG. 5), for each flagged 8 by 8 block, a spatially correlated 2 by 2 blocks from the 1,2, or 3 sub band sub matrices is selected.

Thus in the case of the two chrominance transformed data coefficient matrices 500 (FIG. 5), if an 8 by 8 block in sub band sub matrix 7 (FIG. 5) is flagged then it will be selected along with a spatially corresponding 4 by 4 block in sub band sub matrix 4, and a 2 by 2 block in sub band sub matrix 1. Similarly blocks in sub band sub matrices 3 and 5 will be selected depending on the selection of spatially correlated blocks in sub band sub matrix 8; and the selection of blocks in sub band sub matrices 1 and 4 will depend on the selection of spatially correlated blocks in sub band sub matrix 7.

Spatial Coefficient Grouper According to the alternative Preferred Embodiment

Figure 15:
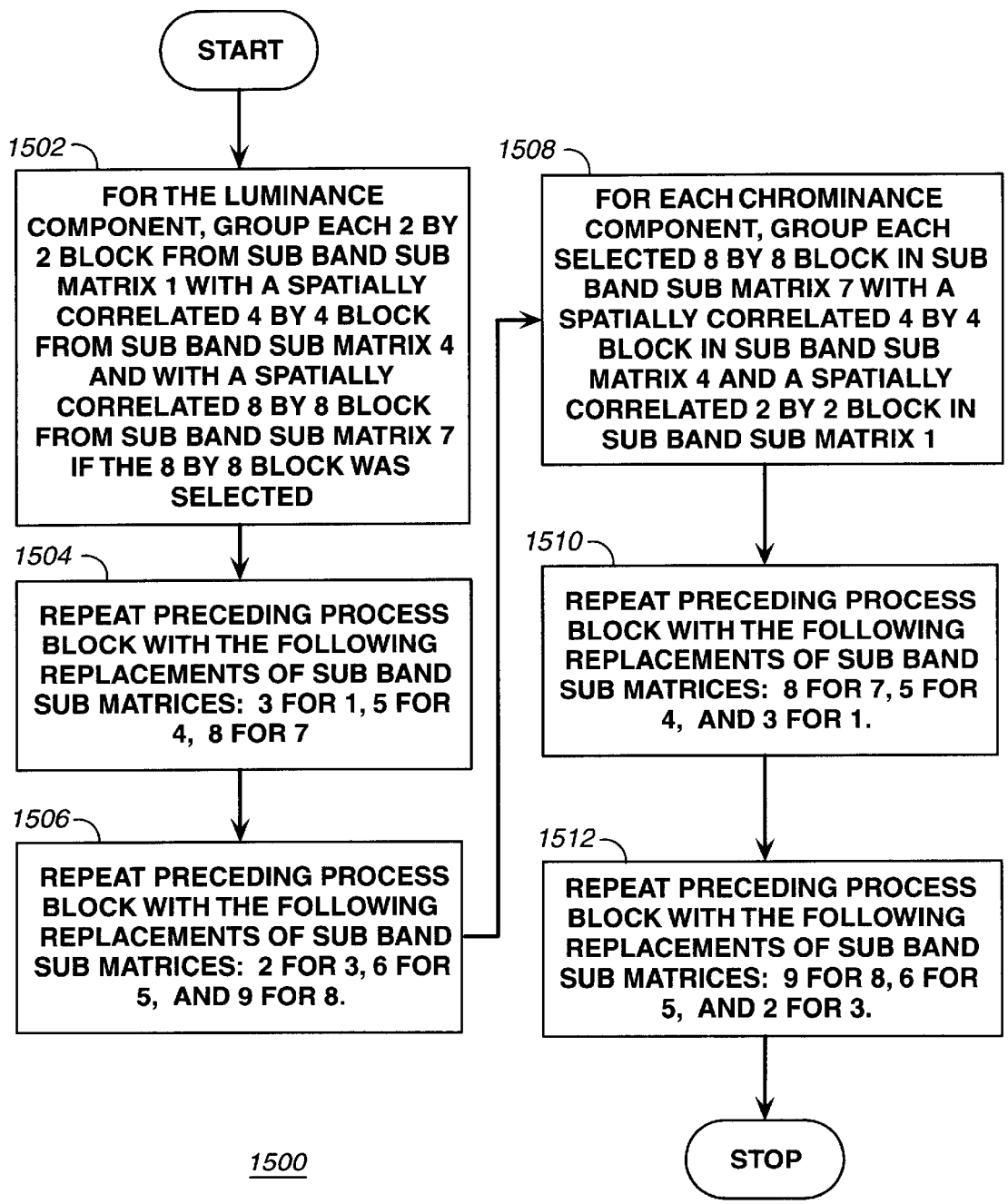
FIG. 15 is a flow diagram of a process performed by the spatial coefficient grouper shown in FIG. 3, according to an alternative preferred embodiment of the invention.

Referring to FIG. 15, a process 1500 performed by the spatial coefficient grouper 308 (FIG. 3) according to the alternative preferred embodiment of the invention is shown.

In process block 1502 for the luminance component transformed coefficient matrix 500, each 2 by 2 block from sub band sub matrix 1 is grouped with a spatially correlated 4 by 4 block from sub band sub matrix 4 and with a spatially correlated 8 by 8 block from sub band sub matrix 7 if the 8 by 8 block was selected by the spatial prioritizer 306 in process 1300 (FIG. 3)

In process block 1504, process block 1502 is repeated with the following sub band sub matrix replacements: 3 for 1, 6 for 4, and 9 for 7.

In process block 1506, process block 1504 is repeated with the following sub band sub matrix replacements: 2 for 3, 5 for 6, and 8 for 9.

In process block 1508 for each chrominance component transformed data coefficient matrix 500, each 8 by 8 block in sub band sub matrix 7 is grouped with a spatially correlated 4 by 4 block from sub band sub matrix 4 and a spatially correlated 2 by 2 block in sub band sub matrix 1.

In process block 1510, process block 1508 is repeated with the following sub band sub matrix replacements: 9 for 7, 6 for 4, and 3 for 1.

In process block 1512, process block 1510 is repeated with the following sub band sub matrix replacements: 8 for 9, 5 for 6, and 2 for 3.

The groups of coefficients formed in process blocks 1502–1512 are spatially correlated subsets of transformed data coefficients, termed 'count planes'.

Figure 12:
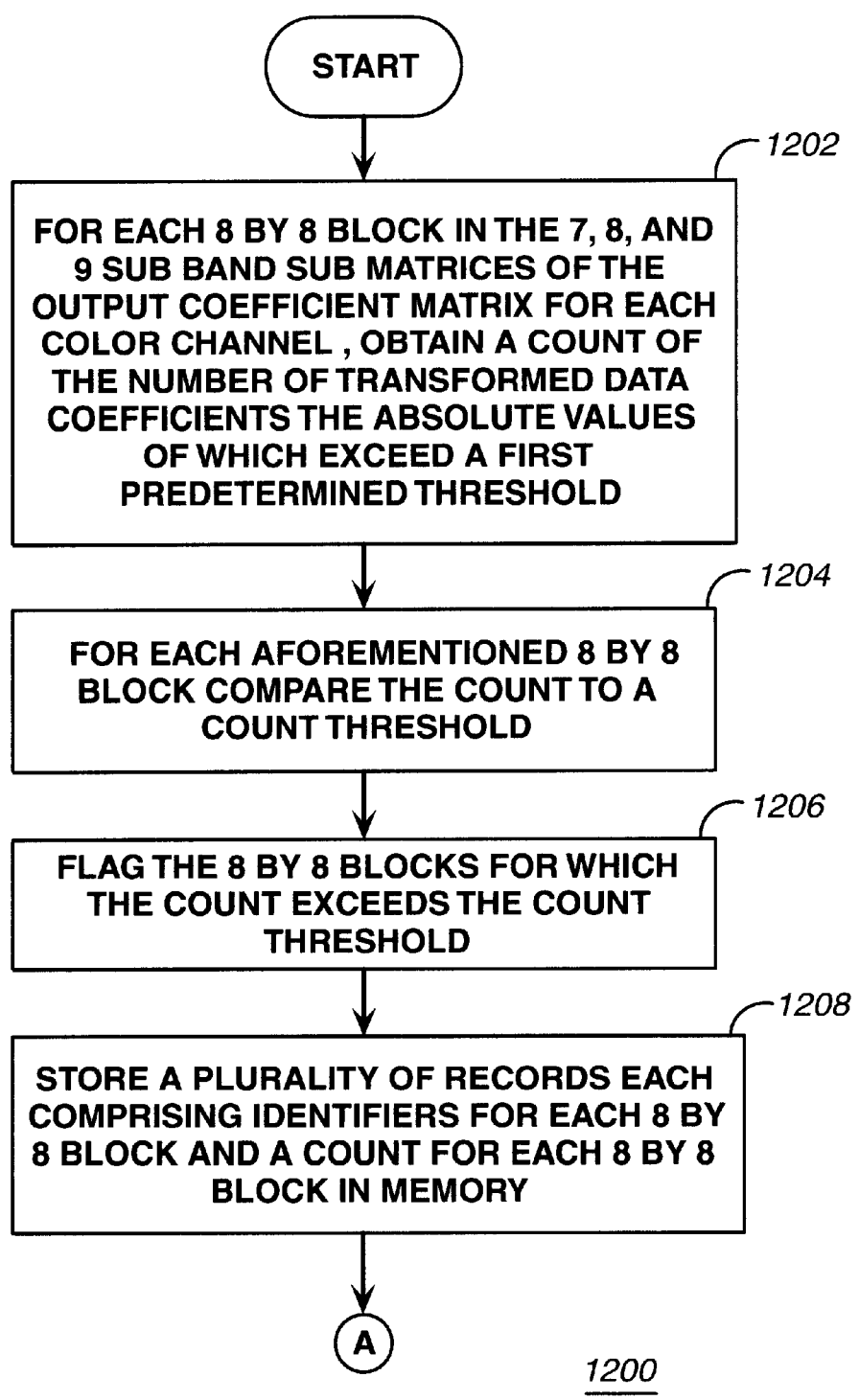
FIG. 12 is a first portion of a flow diagram of a process performed by the spatial activity analyzer shown in FIG. 3, according to an alternative preferred embodiment of the present invention.

Note that, the luminance component is treated differently than the two chrominance components by the spatial prioritizer selector 306, and the spatial coefficient grouper 308 according to the processes shown in FIGS. 14 and 15. According to the alternative preferred embodiment, sub band sub matrixes 1 to 6 will always be sent for the luminance be selected, but in the case of the two chrominance components they will only be sent if the spatially correlated 8 by 8 blocks in sub band sub matrices 7–9 meet the criteria of the spatial activity analyzer 304 (FIG. 3) as determined in process 1200 (FIG. 12). This distinction is based on an understanding of human visual perception, from which it is known that the human eye is more sensitive to changes in luminance as opposed to chrominance.

Note that as each group is formed it may be stored in memory before another group is formed.

Figure 16:
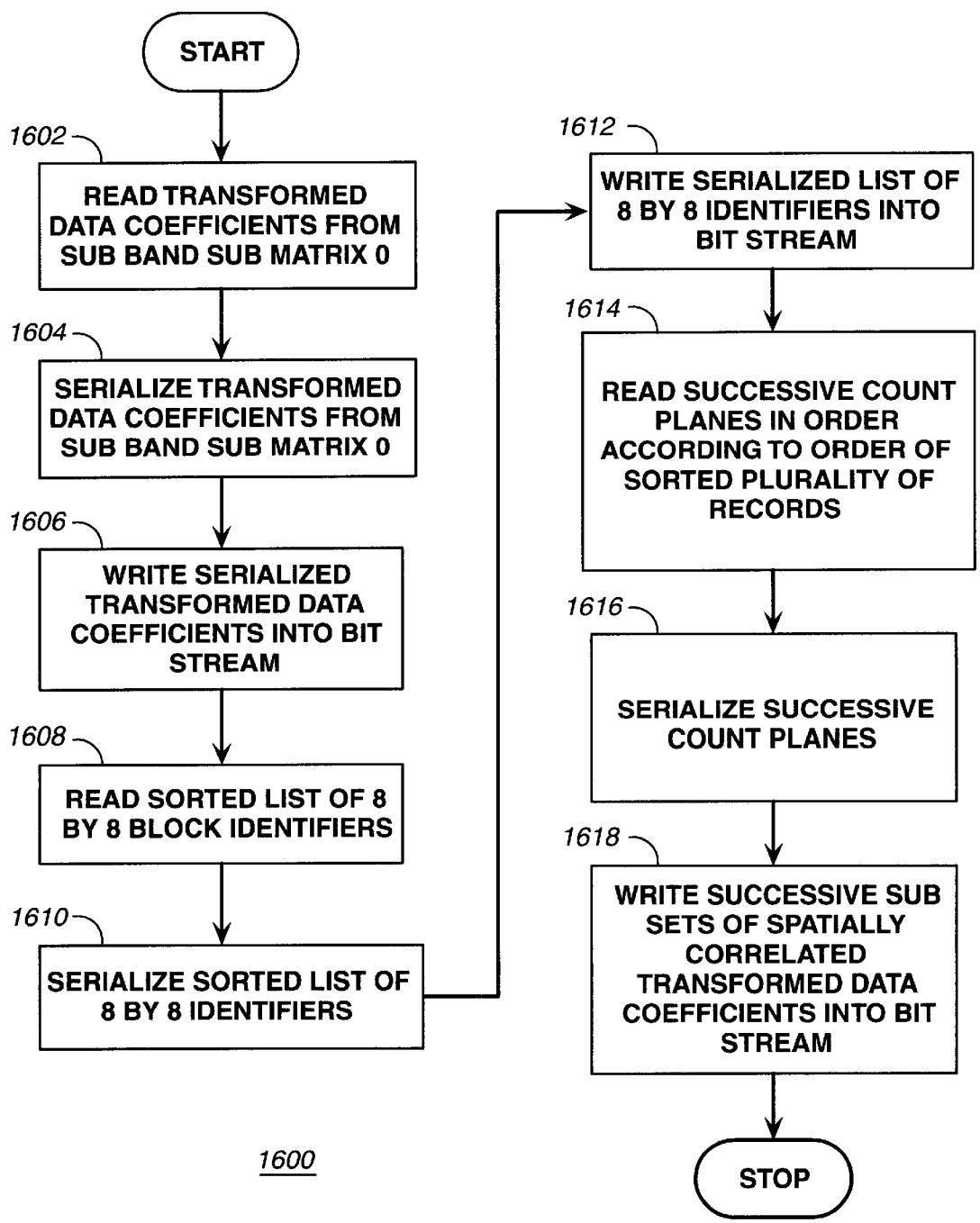
FIG. 16 is a flow diagram of a process performed by the bit stream formatter shown in FIG. 3 according to an alternative preferred embodiment of the invention.

Bit Stream Formatter According to the Alternative Preferred Embodiment of the Invention Referring to FIG. 16, a process 1600 performed by a bit stream formatter 310 (FIG. 3) according to the alternative preferred embodiment of the invention is shown.

In process block 1602 the transformed data coefficients from sub band sub matrices 0 from the luminance and the two chrominance transformed data coefficients matrices 500 are read.

In process block 1604 the transformed data coefficients read in process block 1604 are serialized.

In process block 1606 the bit sequences are written into a bit stream in a predetermined order.

In process block 1608 the sorted list of 8 by 8 identifier which had been extracted by the spatial activity analyzer 304 (FIG. 3) in process block 1214 (FIG. 12B) is read.

In process block 1610 the sorted list of 8 by 8 block identifiers is serialized.

In process block 1612 the serialized list of 8 by 8 block identifiers is written into the bit stream.

In process block 1614, successive count planes are read in order according to the sort order obtained in process block 1212.

In process block 1616 successive count planes are serialized.

In process block 1618 successive serialized subsets of spatially correlated transformed coefficients are written into the bit stream.

Thus, according to the alternative preferred embodiment, the count planes will be written into the bit stream in order according to the count of the number transformed data coefficients in each 8 by 8 block that exceed the first predetermined threshold.

Different color channel subsets can be blocked together in the bit stream or interleaved.

Figure 17:
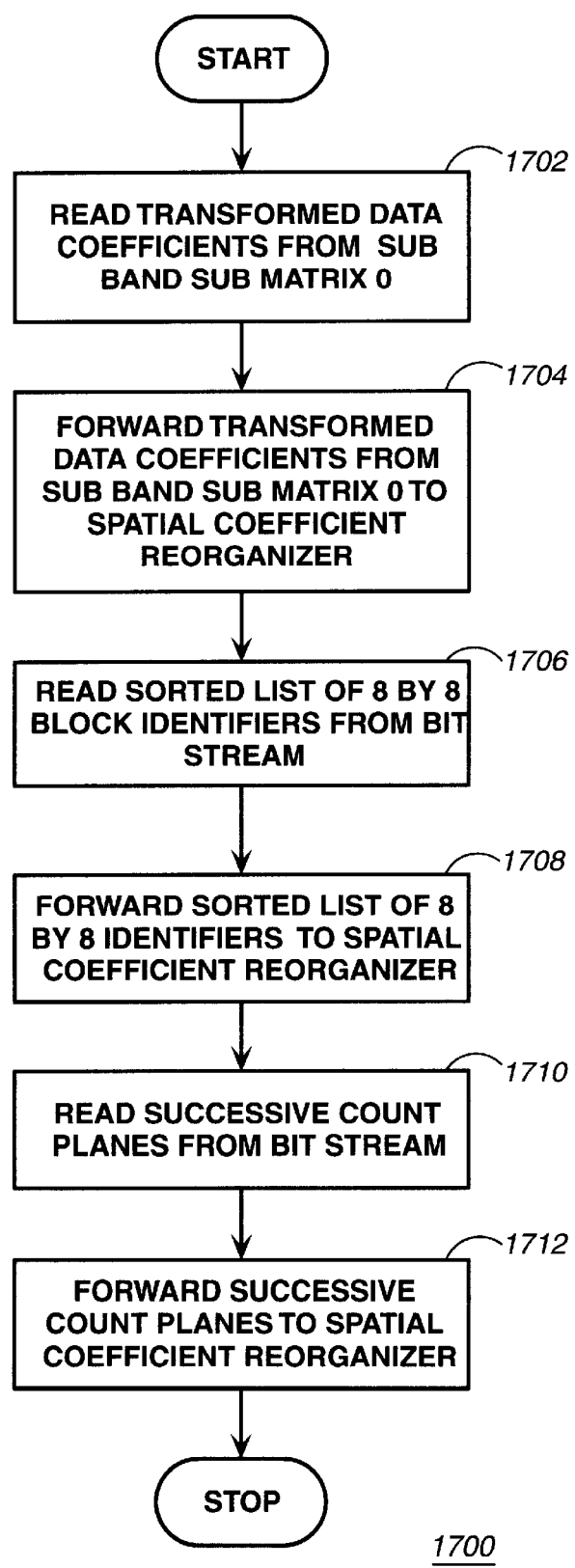
FIG. 17 is a flow diagram of a process performed by the bit stream parser shown in FIG. 4 according to an alternative preferred embodiment of the invention.

Functional Description of a Bit Stream Parser According to the Alternative Preferred Embodiment Referring to FIG. 17 a flow diagram of a process 1700 performed by the bit stream parser 404 (FIG. 4) according to an embodiment of the invention is shown.

In process block 1702, transformed data coefficients from sub band sub matrix 0 are read from the bit stream.

In process block 1704, the transformed data coefficients from sub band sub matrix 0 are forwarded to the spatial coefficient reorganizer 406 (FIG. 4)

In process block 1706 the sorted list of 8 by 8 block identifiers is read from the bit stream.

In process block 1708 the sorted list of 8 by 8 block identifiers is forwarded to the spatial coefficient reorganizer 406 (FIG. 4)

In process block 1710 successive count planes are read from the bit stream.

In process block 1712 successive count planes are forwarded to the spatial coefficient reorganizer.

Figure 18:
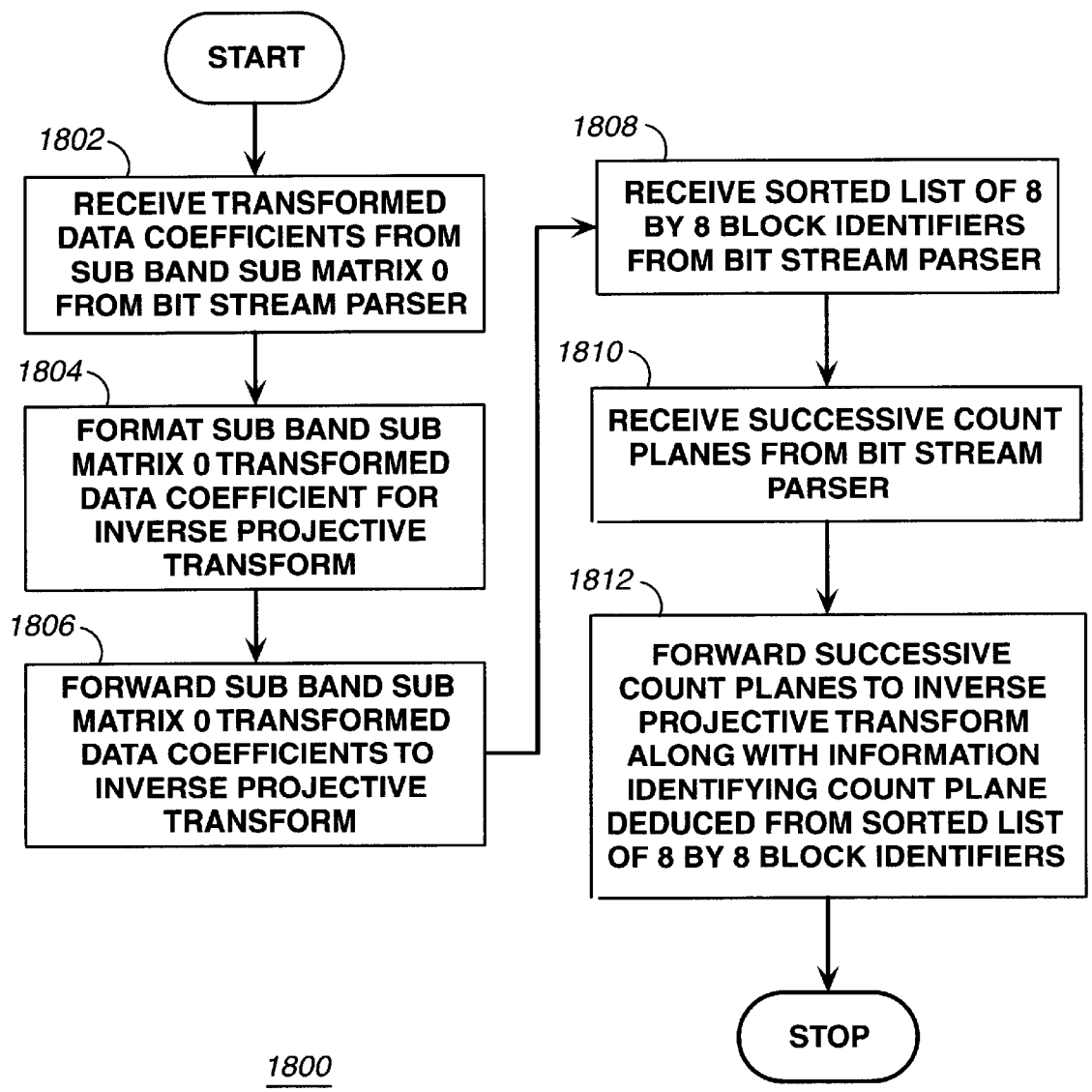
FIG. 18 is a flow diagram of a process performed by the spatial coefficient reorganizer shown in FIG. 4 according to an alternative preferred embodiment of the invention.

Functional Description of a Process Performed by the Spatial Coefficient Reorganizer According to the Alternative Preferred Embodiment Referring to FIG. 18, a flow diagram of a process 1800 performed by the spatial coefficient reorganizer 406 (FIG. 4) according to the alternative preferred embodiment is shown.

In process block 1802 transformed data coefficients from sub band sub matrix 0 are received from the bit stream parser 404 (FIG. 4).

In process block 1804 the transformed data coefficients from sub band sub matrix 0 are formatted for the inverse projective transform 408, FIG. 4.

In process block 1806 the transformed data coefficients from sub band sub matrix 0 are forwarded to the inverse projective transform 408, FIG. 4.

In process block 1808 the sort list of 8 by 8 block identifiers is received from the bit stream parser 404 (FIG. 4).

In process block 1810 successive count planes are received from the bit stream parser 404 (FIG. 4)

In process block 1812, successive count planes are forwarded to the projective inverse transform 408 (FIG. 4) along with information identifying each count plane that is deduced from the sorted list of 8 by 8 block identifiers. As each successive count plane is received, the spatial coefficient reorganizer can deduce by examining the identification of each successive member of list of 8 by 8 block identifiers. Knowledge of the spatial correlation between each 8 by 8 block from sub band sub matrices 7, 8, 9 and other blocks from other sub band sub matrices is programmed into the spatial coefficient reorganizer 406 (FIG. 4), so that it can identify other transformed data coefficients in the count planes in addition to the transformed data coefficients from the 8 by 8 blocks and properly identify those additional coefficient to the inverse projective transform 408 (FIG. 4). Note that the information identifying the count planes to the inverse projective transform may not be explicit. It can be implied in the positioning coefficients extracted from the count plane in a matrix in which they are placed by the spatial coefficient reorganizer for processing by the inverse projective transform 408 (FIG. 4).

Functional Description of Region of Interest Based Prioritization

Figure 19:
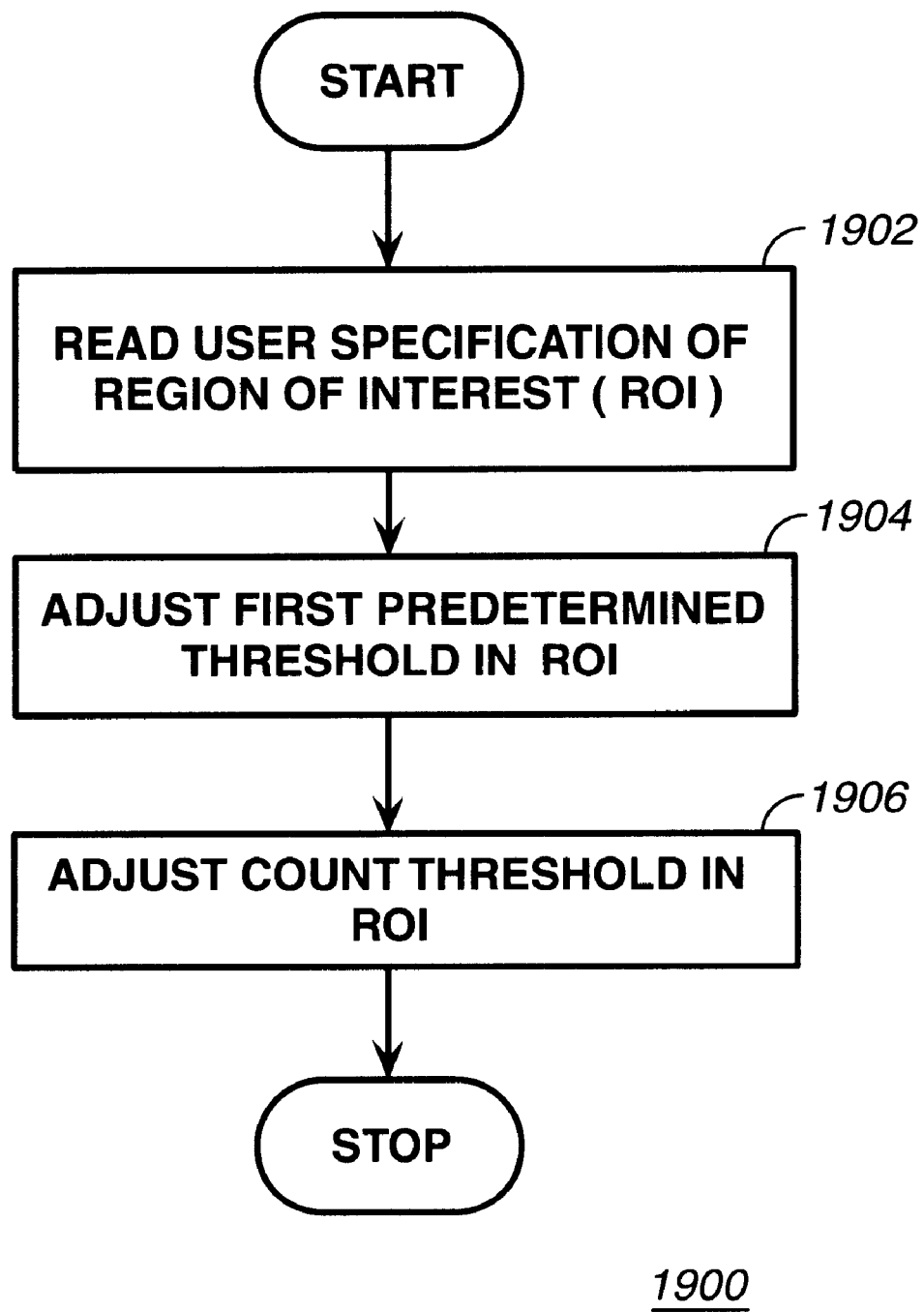
FIG. 19 is a flow diagram of a process performed by the spatial activity analyzer shown in FIG. 3 according to an alternative preferred embodiment of the present invention.

FIG. 19 shows an optional process 1900 for the spatial activity analyzer 304 for prioritizing use of bits in encoding an image based on a user input region of interest is shown. The process is particularly suited for applications in which the encoder 300 (FIG. 3) is run on a computer for converting bit map images, in which case the encoded image may be stored, e.g. on the image source server 102 (FIG. 1) rather than being transferred immediately.

For the purpose of implementing the process shown in FIG. 19, the image encoder would be provided with a graphical user interface (GUI) which a user could use to view an image and select one or more areas regions of interest. The GUI could for example allow the user to size and position a rectangle over an area of the image in order to select it as a region of interest. Providing this type of GUI is within the ability of a person having ordinary skill in the GUI programming art.

Referring to FIG. 19, in process block 1902, a user specification of a region of interest is read.

In process block 1904 a value of the first predetermined threshold to be used within the ROI is set.

In process block 1906 a value of the count threshold to be used within the ROI is set.

The values set in process block 1904, and 1906 are different from other values which can be default values which are used outside the ROI.

Generally speaking either the first preselected threshold, the count threshold, or both will be lowered in the ROI. The two thresholds may or may not be increased outside of the ROI.

Lowering the first predetermined threshold in the ROI will increase the count for 8 by 8 blocks in the ROI and improve the positioning of count planes corresponding to the ROI in the sorted list extracted in process block 1214 (FIG. 13) Lowering the count threshold to be used in the ROI will increase the number of 8 by 8 blocks in the ROI that are selected in process 1500 (FIG. 15)

Functional Description of Variable SNR Embodiment

Figure 20:
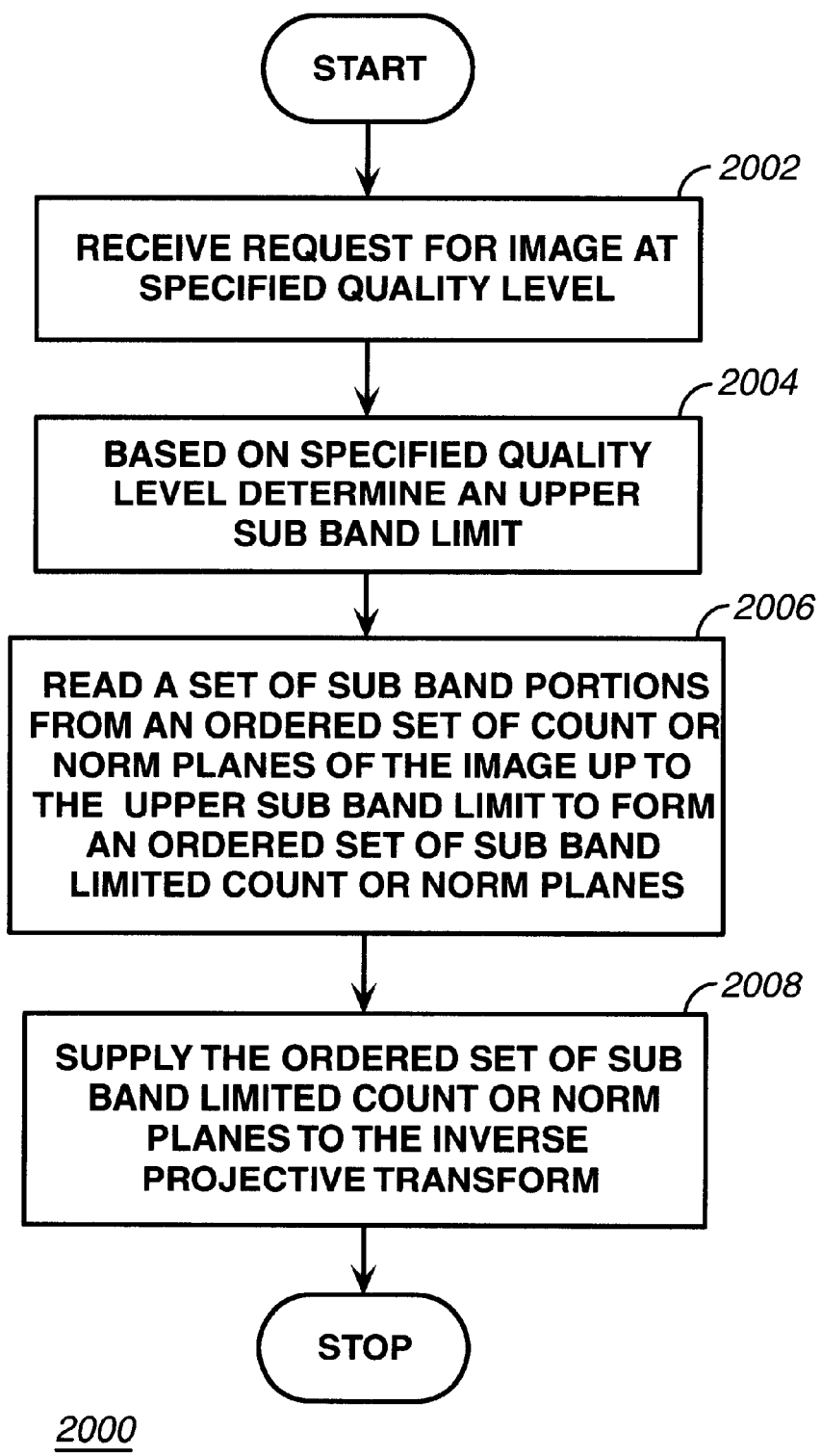
FIG. 20 is a flow diagram of a process performed by the image encoder shown in FIG. 3 or the image decoder shown in FIG. 4 according to an alternative preferred embodiment of the invention.

FIG. 20 shows a process 2000 by which an image represented by transformed data coefficients which is arranged in a set of norm or count planes can be accessed at a selected signal to noise ratio (SNR) level. The process can be implemented on the encoder 300 (FIG. 3) or it may be implemented on the decoder 400 (FIG. 4) side. In the former case it can be implemented in the bit stream formatter 310 (FIG. 3) which would selected certain transformed data coefficients to encode. In the latter case it can be implemented by the bit stream parser 404 (FIG. 4).

Referring to FIG. 20, in process block 2002 a request for an image at a specified quality level is received, e.g., as a subroutine call.

In process block 2004 based on the specified quality level an upper sub band limit is determined. For example for thumb nail quality the upper sub band limit will be set at zero. In the case of a three level wavelet transform medium quality could correspond to an upper sub band limit of 3 or 6. For the highest quality, the upper sub band limit would correspond to the highest sub band-sub band nine in the case of a three level wavelet transform.

In process block 2006 a set of sub band portions are read from an ordered set of count or norm planes of the image up to the upper sub band limit to form an ordered set of sub band limited count or norm planes. Process block 2006 preserves the ordering which is preferably based on the level of activity.

In process block 2008 the ordered set of sub band limited count or norm planes is supplied to the inverse projective transform 408 (FIG. 4)

The term natural domain as used in the present specification means spatial domain or temporal domain. For an audio signal the term natural domain refers to a time domain.

Figure 21:
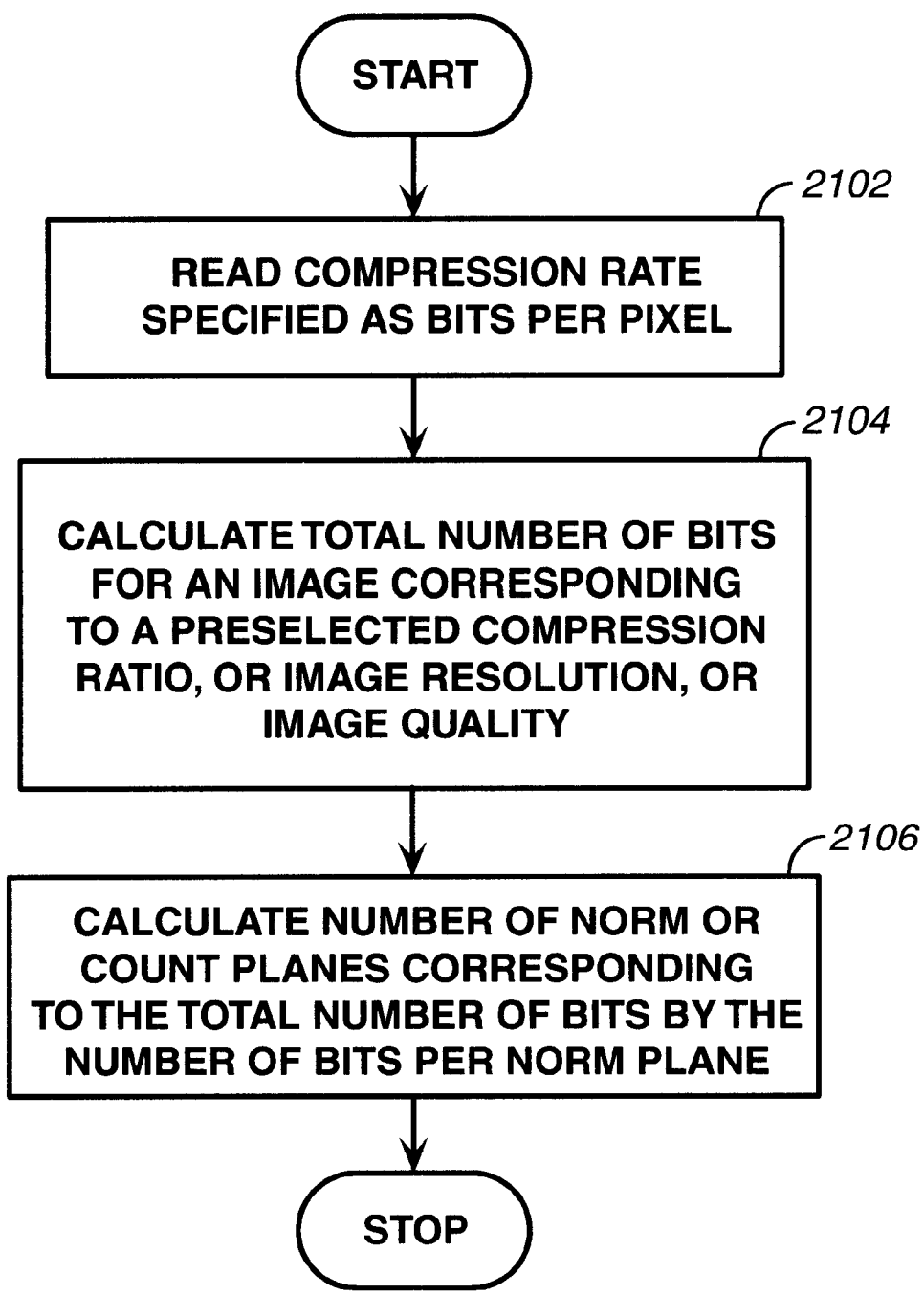
FIG. 21 is a flow diagram of a process that can be performed by the bit stream formatter shown in FIG. 3 according to an alternative preferred embodiment of the invention.

FIG. 21 is a flow diagram of a process that can be performed by the bit stream formatter 310 (FIG. 3) in order to determine a number of count or norm planes to be encoded. Alternatively, the process shown in FIG. 21 could be performed by the spatial prioritizer selector 306 (FIG. 3) to limit the number of norm planes selected.

Referring to FIG. 21, in the process block 2102 a compression rate specified in bits per pixel or an available system bandwidth or user defined image resolution or image quality is read. The compression rate can be a predetermined value that is used in a particular wireless network. The compression rate can be selected in view of the currently available bandwidth to obtain image transport times that do not cause noticeable delay to a user. Also, the compression rate can be calculated from a specified image resolution from which the number of norm planes can be selected by properly arranging the subbands in the bitstream of such multiresolutional system. Alternatively, image quality can be specified and an approximate compression rate can be selected from a programmed look-up table. Based on the codec performance, several test images may be tested a priori and a relationship between image quality and compression rate be obtained to form the table.

In process block 2104, a total number of bits to be allocated for a compressed version of an image is calculated based on either a preselected compression ratio, an image resolution, or image quality.

In process block 2106, a total number of norm or count planes corresponding to the total number of bits number of calculated in process block 2104 is determined. The total number of transformed data coefficients for a norm plane is, according to the embodiment described above in connection with FIGS. 6–11, fixed at 256 ultimately, depending on the number of wavelet transformation levels. If, as is preferred, the transformed data coefficients are not quantized, then the total number of bits in a norm plane is simply the total number of transformed data coefficients in a norm plane multiplied by the number of bits used to represent each transformed data coefficient (8 bits is suitable for non-scientific applications). Given the number of bits per norm plane, process block 2106 can be accomplished by dividing the total number of bits for the image, as calculated in process block 2104, by the number of bits per norm plane. If transformed data coefficients are quantized, the number of bits per norm plane will be reduced.

The invention provides a method and system for selecting and ordering spatially correlated subsets of coefficients based on their relative importance in conveying data (e.g., image) information. By encoding and decoding the selected, and/or sorted spatially correlated subsets of coefficients a higher fidelity (as indicated for example by SNR) representation of the data can be obtained, for a given byte size of the sub sets decoded.

According to one aspect the invention provides a method of encoding a data set comprising steps of: performing a transform on a data set to obtain a set of transformed data coefficients; forming a plurality of subsets of transformed data coefficients corresponding to a set of regions of the data set by grouping transformed data coefficients from the set of transformed data coefficients; and calculating a measure of activity corresponding to each of the plurality of subsets of transform coefficients.

According to another aspect the invention provides a computer readable medium containing programming instructions for encoding a data set comprising programming instructions for: reading a set of transformed data coefficients corresponding to a data set; obtaining a measure of variation over a region of the data set; determining whether to extract a subset of transformed data coefficients that is spatially correlated to the region of the data set on the basis of the measure of variation; and extracting a subset of transformed data coefficients.

According to yet another aspect the invention provides a method of processing a set of transformed data coefficients output by a wavelet signal decomposer comprising steps of: receiving a set of transformed data coefficients output by a wavelet signal decomposer; computing a set of measures of variation corresponding to a set of selected areas of a transformed image that is represented by the set of transformed data coefficients; selecting a subset of the set of areas of the transformed image on the basis of the set of measures of variation; determining an ordering for the subset of the set of areas on the basis of the set of measures of variation; and grouping a set of subsets of the set of transformed data coefficients corresponding to the set of areas of the image.

According to a further aspect the invention provides An encoder for encoding a data set comprising: a signal decomposer for receiving an input data set and outputting a set of transformed data coefficients; a spatial activity analyzer for determining a set of measures of variation of the data set on the basis of the set of transformed data coefficients; a spatial prioritizer/selector for performing a function selected from a group consisting of selecting a set of subsets of the set of transformed data coefficients and determining an ordering for a set of subsets of the set of transformed data coefficients; and a spatial coefficient grouper for collecting together a plurality of spatially correlated subsets of the set of transformed data coefficients.

According to a still further aspect, the invention provides a decoder for decoding an encoded data set comprising: a bit stream parser for extracting a set of spatially correlated subsets of a set of transformed data coefficients from a bit stream; a spatial coefficient reorganizer for forwarding the set of spatially correlated subsets of the set of transformed data coefficients to an inverse signal decomposer along with an indication of the spatial association of each sub set.

According to a still further aspect, the invention provides a communication system comprising: an image source server comprising: a signal decomposer for receiving an input data set and outputting a set of transformed data coefficients; a spatial activity analyzer for determining a set of measures of variation of the data set on the basis of the set of transformed data coefficients; a spatial prioritizer/ selector for performing a function selected from a group consisting of selecting a set of subsets of the set of transformed data coefficients and determining an ordering for a set of subsets of the set of transformed data coefficients; and a spatial coefficient grouper for collecting together a plurality of spatially correlated subsets of the set of transformed data coefficients; and a bit stream formatter for writing the plurality of spatially correlated subsets into a bit stream; a network; a communication device comprising: a bit stream parser for extracting the plurality of spatially correlated subsets from a bit stream; a spatial coefficient reorganizer for forwarding the plurality of spatially correlated sub sets to an inverse signal decomposer along with an indication of the spatial association of each sub set.

According to a still further aspect, the invention provides a method of prioritizing transformed data coefficients output by a discrete wavelet transform comprising steps of: selecting a block of luminance transformed data coefficients from a first sub band sub matrix in a luminance transformed data coefficient matrix; selectively selecting a corresponding block of chrominance transformed data coefficients from a corresponding sub band sub matrix in a chrominance transformed data coefficient matrix on the basis of a measure of activity corresponding to the corresponding block.

Although the invention has been explained above with reference to flow diagrams the invention is not limited to implementation as one or more programs run on general purpose microprocessor base systems. The invention can be implemented in whole or in part, using digital signal processing (DSP) chips, and application specific integrated circuits (ASIC).

The flow diagrams do not necessarily dictate a specific temporal sequences of process steps. Additionally the process need not be broken down as shown in the FIGS. Variations, in addition to those explicitly mentioned above, are within the skill of persons having ordinary skill in the image processing art.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. An encoder for encoding a data set, comprising:
   a signal decomposer for receiving an input data set corresponding to a single data frame and outputting a set of transformed data coefficients;
   an analyzer for determining a set of first order magnitude differences, set of L-1 norms, for various neighborhood (blocks) of pixels within a defined subband, to arrange the different areas with a subband from highest to lowest values, denoting its significance in the frame; and
   a grouper to find the spatially correlated blocks in the remaining subbands within the image frame to form a set of norm planes ordered according the previously determined significance so that the norm planes with higher priority are coded first.

2. A communication system, comprising:
   an image source server, comprising:
   a signal decomposer for receiving an input data set corresponding to a single data frame and outputting a set of transformed data coefficients;
   a subband spatial activity analyzer for determining a set of first-order magnitude differences set of L-1 norms, within a neighborhood of a data set of a defined subband of the set of transformed data coefficients;
   a prioritizer for performing a function of arranging from highest to lowest magnitude the set of said L1 norm results within the defined subband of a frame;
   a subband spatial selector that finds in the remaining subbands of a frame the spatially correlated areas corresponding to the neighborhood outputted from the prioritizer;
   a spatial grouper for collecting together a plurality of the spatially correlated subset areas arranged in a form of norm planes whose ordering is determined by the output of the prioritizer and the subband spatial selector; and
   a bit stream formatter for buffering the complete plurality of all norm planes as outputted by the spatial grouper or a subset of said norm planes according a measure set by a rate allocator;
   a transmission means;
   a communication device comprising:
   a bit stream parser for extracting the plurality of all received norm planes; and
   a subband spatial coefficient reorganizer for forwarding the plurality of norm planes to an inverse signal decomposer along with an indication of the spatial association of each subset.

3. A communication system according to claim 2, wherein the network comprises a wireless network containing error detection and correction capabilities.

4. A wireless communication device comprising:
   a memory;
   a data processing device;
   an image acquisition device;
   a signal decomposer for receiving an input data set corresponding to a single data frame and outputting a set of transformed data coefficients;
   a subband spatial activity analyzer for determining a set of first-order magnitude differences set of L-1 norms, within a neighborhood of a data set of a defined subband of the set of transformed data coefficients;
   a prioritizer for performing a function of arranging from highest to lowest magnitude the set of said L1 norm results within the defined subband of a frame;
   a subband spatial selector that finds in the remaining subbands of a frame the spatially correlated areas corresponding to the neighborhood outputted from the prioritizer;
   a spatial grouper for collecting together a plurality of the spatially correlated subset areas arranged in a form of norm planes whose ordering is determined by the output of the prioritizer and the subband spatial selector;
   a bit stream formatter for writing/buffering the complete plurality of all norm planes as outputted by the spatial grouper or a subset of said norm planes according a measure set by a rate allocator; and
   a transceiver for transmitting the plurality of norm planes outputted by the bit stream formatter.

5. The wireless communication device of claim 4, further comprising;
   a transceiver for receiving the plurality of norm planes outputted by the bit stream formatter;
   an error correction stage to correct the received the plurality of norm planes data corrupted during transmission;
   a subband spatial coefficient reorganizer;
   an inverse signal decomposer; and
   an error concealment stage to further improve the image quality of the recovered image.

6. The wireless communication device of claim 4, further comprising;
   a transceiver for receiving the plurality of norm planes outputted by the bit stream formatter;
   a subband spatial coefficient reorganizer; and
   an inverse signal decomposer.

7. The encoder of claim 6 wherein the input video sequence consists of one or more color components.

8. The encoder of claim 6 wherein the input video sequence consists of at least one decimated color component.

9. An encoder for encoding a data set, comprising:
   a signal decomposer for receiving an input data set corresponding to a single data frame and outputting a set of transformed data coefficients;
   a subband spatial activity analyzer for determining a set of first-order magnitude differences set of L-1 norms, within a neighborhood of a data set of a defined subband of the set of transformed data coefficients;
   a prioritizer for performing a function of arranging from highest to lowest magnitude the set of said L1 norm results within the defined subband of a frame;
   a subband spatial selector that finds in the remaining subbands of a frame the spatially correlated areas corresponding to the neighborhood outputted from the prioritizer; and
   a spatial grouper for collecting together a plurality of the spatially correlated subset areas arranged in a form of norm planes whose ordering is determined by the output of the prioritizer and the subband spatial selector.

10. An encoder according to claim 9 further wherein encoder further comprises:
    a rate allocator for further reducing an encoded image file.

11. The encoder of claim 9 receiving an input data set corresponding to a set of image frames, whereby each frame is intra coded.

* * * * *

UNITED STATES PATENT AND TRADEMARK OFFICE
CERTIFICATE OF CORRECTION

PATENT NO.      : 6,661,927 B1
DATED           : December 9, 2003
INVENTOR(S)     : Suarez et al.

It is certified that error appears in the above-identified patent and that said Letters Patent is hereby corrected as shown below:

Drawings,
FIG. 9, box 910, "ANDTHE" should read -- AND THE --
FIG. 10, box 1002, "FROMFROM" should read -- FROM --
FIG. 14, boxes 1406 and 1408, "COMPONENTS" should read -- COMPONENT --

Column 1,
Line 59, "TPEG" should read -- JPEG --

Column 5,
Line 7, delete second occurrence of "the"
Line 52, delete "a"
Line 61, insert a period -- . -- at the end of sentence Column 6,
Line 35, "a", second occurrence, should read -- an --
Line 49, "is" should read -- are --
Line 60, "coefficients" should read -- coefficient --
Line 64, "indications" should read -- indication --

Column 7,
Line 60, "case a" should read -- case of a --
Line 62, "device can" should read -- device and can --

Column 8,
Line 17, "run another" should read -- run on another --
Line 33, "their" should read -- its --
Line 34, "limitations what" should read -- limitations on what --
Line 35, "their" should read -- its --

Column 9,
Line 15, "4)can" should read -- 4) can --
Line 24, "a", second occurrence, should read -- an --
Line 26, "discreet" should read -- discrete --
Line 33, "corresponding low" should read -- corresponding to low --
Line 35, "matrixes" should read -- matrices --
Line 47, "to an a" should read -- to a --

UNITED STATES PATENT AND TRADEMARK OFFICE
CERTIFICATE OF CORRECTION

PATENT NO. : 6,661,927 B1
DATED : December 9, 2003
INVENTOR(S) : Suarez et al.

It is certified that error appears in the above-identified patent and that said Letters Patent is hereby corrected as shown below:

Column 10,
Line 14, "expression" should read -- expressions --

Column 11,
Line 2, "according the" should read -- according to the --
Line 11, "performed process" should read -- performed in process --
Line 46, "for" should read -- from --
Line 51, "process" should read -- processes --

Column 12,
Line 14, "cab" should read -- can --
Line 48, delete "for example"

Column 13,
Line 33, "planes" should read -- plane's --
Line 63, delete second occurrence of "the"

Column 14,
Lines 51 and 52, first sentence, should read as follows:
 -- The first predetermined threshold value and/or the predetermined count threshold can be varied across the image. --

Column 15,
Line 9, delete "a"
Line 13, delete the space before the comma

Column 16,
Line 24, "identifier" should read -- identifiers --

Column 17,
Line 59, delete "area"

Column 18,
Line 27, "selected" should read -- select --

Column 19,
Line 16, delete second occurrence of "of"

UNITED STATES PATENT AND TRADEMARK OFFICE
CERTIFICATE OF CORRECTION

PATENT NO.   : 6,661,927 B1
DATED        : December 9, 2003
INVENTOR(S)  : Suarez et al.

It is certified that error appears in the above-identified patent and that said Letters Patent is hereby corrected as shown below:

Column 20,
Line 4, "An" should read -- an --

Signed and Sealed this

Twenty-fourth Day of February, 2004

JON W. DUDAS
*Acting Director of the United States Patent and Trademark Office*